United States Patent
Jensen

(10) Patent No.: US 11,869,346 B2
(45) Date of Patent: Jan. 9, 2024

(54) REAL-TIME AIRCRAFT TURBULENCE SENSING, REPORTING, AND MAPPING SYSTEM AND METHOD FOR ENHANCING PASSENGER SAFETY AND COMFORT

(71) Applicant: RUMFERT, LLC, Omaha, NE (US)

(72) Inventor: David D. Jensen, Omaha, NE (US)

(73) Assignee: RUMFERT, LLC, Omaha, NE (US)

( * ) Notice: Subject to any disclaimer, the term of this patent is extended or adjusted under 35 U.S.C. 154(b) by 0 days.

(21) Appl. No.: 17/844,028

(22) Filed: Jun. 19, 2022

(65) Prior Publication Data

US 2022/0319343 A1 Oct. 6, 2022

Related U.S. Application Data

(63) Continuation of application No. 16/724,316, filed on Dec. 22, 2019, now Pat. No. 11,450,218.

(51) Int. Cl.
*G08G 5/00* (2006.01)
*B64D 45/00* (2006.01)

(52) U.S. Cl.
CPC .......... *G08G 5/0091* (2013.01); *B64D 45/00* (2013.01); *G08G 5/0004* (2013.01); *G08G 5/0021* (2013.01); *B64D 2045/0085* (2013.01)

(58) Field of Classification Search
CPC .. G08G 5/0091; G08G 5/0004; G08G 5/0021; B64D 45/00; B64D 2045/0085
See application file for complete search history.

(56) References Cited

U.S. PATENT DOCUMENTS

| | | | |
|---|---|---|---|
| 6,963,291 B2 | 11/2005 | Holforty et al. | |
| 8,005,583 B2 | 8/2011 | Lacaze et al. | |
| 8,063,816 B2 | 11/2011 | O'Connor et al. | |
| 8,102,301 B2 | 1/2012 | Mosher | |
| 8,130,121 B2 | 3/2012 | Smith et al. | |
| 8,306,677 B2 | 11/2012 | Deker et al. | |
| 8,629,788 B1 | 1/2014 | Greenleaf et al. | |
| 8,909,158 B2 | 12/2014 | O'Connor et al. | |
| 8,965,699 B2 | 2/2015 | McDonald | |
| 9,126,696 B1 | 9/2015 | Hampel et al. | |

(Continued)

OTHER PUBLICATIONS https://ams.confex.com/ams/2020Annual/webprogram/Paper367508.html. Larry Cornman NCAR. Presentation by National Center for Atmospheric Research on the research program with the FAA developing an algorithm for detecting turbulence based on ADS-B data. Dated Jan. 14, 2020.

(Continued)

*Primary Examiner* — Michael J Zanelli
*Assistant Examiner* — Anthony M Gartrelle

(57) ABSTRACT

Systems and methods are disclosed for periodic real-time reporting of in-flight turbulence experienced by aircraft using the existing Automatic Dependent Surveillance-Broadcast (ADS-B) messaging system. The invention includes both broadcast to and reception from other aircraft and ground stations using the ADS-B system. Systems and methods for displaying the received turbulence reports on a cockpit display system are also disclosed. The disclosed systems and methods accomplish the objectives of the invention on a non-interference basis with existing ADS-B system functionality by utilizing currently reserved message types and/or unused data fields for the turbulence reporting. The invention is applicable to both 1090ES and 978 UAT ADS-B systems.

20 Claims, 13 Drawing Sheets

(56) References Cited

U.S. PATENT DOCUMENTS

| | | |
|---|---|---|
| 9,208,687 B2 | 12/2015 | Wang et al. |
| 9,255,804 B2 | 2/2016 | Garcia et al. |
| 9,274,521 B1 | 3/2016 | Stefani et al. |
| 9,530,323 B1 | 12/2016 | Maji et al. |
| 9,881,507 B2 | 1/2018 | Rencher et al. |
| 10,116,374 B2 | 10/2018 | Dyson |
| 2007/0260366 A1 | 11/2007 | Lacaze et al. |
| 2008/0119971 A1 | 5/2008 | Deker et al. |
| 2012/0259549 A1 | 10/2012 | McDonald |
| 2018/0155052 A1 | 6/2018 | Lacroix et al. |
| 2018/0172800 A1 | 6/2018 | Wang |
| 2018/0301039 A1 | 10/2018 | Leon et al. |

OTHER PUBLICATIONS https://medium.com/faa/taking-the-turbulence-out-of-flight-9af30f7bf323. Callie Dosberg, FAA Office of Communications. Article in FAA publication describing work on turbulence detection using the ADS-B data. Dated May 13, 2020.

https://www.faa.gov/sites/faa.gov/files/2022-03/508. 10Spring2022REDACNASOps_WTIC.pdf. Gary Pokodner FAA Program Manager. FAA slide presentation on status (2022-2024) of Weather Technology in the Cockpit (WTIC). Dated Mar. 15, 2022.

https://medium.com/faa/dislike-turbulent-flights-9ffa7b819f9f. Eric Spears and Tammy Flowe, FAA Office of NextGen. Article in FAA publication on use of ADS-B data for turbulence detection. Dated Apr. 2022.

https://my.rtca.org/NC_Product?id=a1B1R00000LoottUAB. RTCA document order form indicating DO-260C publication date of Dec. 17, 2020.

https://www.faa.gov/air_traffic/technology/adsb/media/ADS-B_In_ Strategy.pdf. FAA ADS-B In stategy document. Appendix A lists the different ADS-B SW versions. Dated Dec. 4, 2019.

https://fpaw.aero/sites/default/files/node/15/edit/4-darr-2020-10-14-ads-b-wx-status.pdf. Stephen Darr, Dynamic Aerospace, Inc.. Slide presentation on development of ADS-B weather. Dated Oct. 14, 2020.

https://skypath.io/; SkyPath web site. Copyright 2023. Per web site—Turbulence and auto-PIREP data source. Real-time turbulence information by automatically sensing and sharing accurate, aircraft behaviour via the iPad.

REAL-TIME AIRCRAFT TURBULENCE SENSING, REPORTING, AND MAPPING SYSTEM AND METHOD FOR ENHANCING PASSENGER SAFETY AND COMFORT

CROSS REFERENCE TO RELATED APPLICATIONS

This application is a continuation of U.S. patent application Ser. No. 16/724,316 filed Dec. 22, 2019 entitled REAL-TIME AIRCRAFT TURBULENCE SENSING, REPORTING, AND MAPPING SYSTEM AND METHOD FOR ENHANCING PASSENGER SAFETY AND COMFORT which claims priority benefit of U.S. Provisional Application Ser. No. 62/785,589 entitled "REAL-TIME AIRCRAFT TURBULENCE SENSING AND MAPPING METHOD FOR ENHANCING PASSENGER SAFETY AND COMFORT," filed Dec. 27, 2018; and U.S. Provisional Application Ser. No. 62/916,744 entitled "REAL-TIME AIRCRAFT TURBULENCE SENSING AND MAPPING SYSTEM AND METHOD FOR ENHANCING PASSENGER SAFETY AND COMFORT," filed Oct. 17, 2019 all of which are hereby incorporated by reference in their entirety.

TECHNICAL FIELD

The subject matter of the invention relates generally to the determination, reporting, and mapping of real-time airborne turbulence reports by aircraft using ADS-B messaging protocols.

BACKGROUND OF THE INVENTION

Turbulence during flight is something experienced by nearly every passenger at one time or another. While not usually dangerous, it is frequently uncomfortable, due in part to its unanticipated/surprise nature and indefinite duration. However, if flight attendants or passengers are up walking about the cabin when a large unexpected bump occurs, it can become quite hazardous.

Currently, reports of turbulence are based either on reports of other pilots (PREPS) or based on forecasts of Significant Metrological conditions (SIGMETs) or Airmen's Metrological Information (AIRMETs). Forecasted conditions are generally geographically broad, whereas PIREPs are geographically specific but highly sporadic and somewhat subjective. Thus, a large improvement in information conveyed to the pilot regarding turbulence would be possible if turbulence information could be relayed real-time, periodically, and automatically using quantitative measurements of actual flight conditions.

Thus, it is a primary objective of the present invention to provide a system of automatically monitoring and communicating the state of turbulence experienced real-time by a aircraft and relaying those reports to other aircraft for display so that areas of turbulence can be avoided or anticipated and proactive measures can be taken to minimize the possibility of injury.

It is a further objective of the invention to utilize, to the greatest extent possible, the existing ADS-B hardware, functionality, software, infrastructure and messaging protocols to achieve the goals of the invention so that the benefits of the invention can be achieved with a minimum of additional cost and impact on the global aerospace infrastructure.

It is an additional objective of the invention to formulate an implementation which, to the largest extent possible, is transparent to the operation of the current ADS-B hardware, firmware and software so that integration of the present invention into the national airspace structure may be accomplished on a non-interference basis.

The FAA has mandated that nearly all aircraft must be equipped with an ADS-B (Out) system by Jan. 1, 2020. As is well understood in the art, ADS-B units periodically output a series of messages conveying aircraft state vectors such as position, airspeed, altitude, intent, flight or tail number, etc. The FAA has designated two options for meeting the requirement. First is the adaption of the 1090 MHz Mode S 'Extended Squitter' (ES) transponders to the ADS-B out function by adding a GPS receiver and incorporating the data in an 'extended squitter' message. This is the method often referred to as 1090 ES and is the only method approved by the FAA for operations above 18,000 feet. The second method is the 978 MHz Universal Access Transmitter (UAT) and is available to be used below 18,000 feet. Thus, transport category aircraft generally use the 1090 ES equipment, whereas smaller general aviation aircraft may use either.

There are many ADS-B manufacturers utilizing several different methods for receiving the sensor data necessary to form the required broadcast messages. There are three basic configurations (plus some sub-combinations). First, the ADS-B unit is connected directly to the sensors such that the aircraft data is input directly to the ADS-B unit. Second, the ADS-B unit itself may be integrated with the GPS sensor. Third, the ADS-B unit may receive the aircraft data via relay from another processor such as an FMS Control/Display Unit (CDU). The latter method is associated with larger transport category, aircraft while the former two are associated with smaller aircraft. Regardless, once the ADS-B unit receives the data, its processor formats or encodes the data into messages for broadcast. There are regulatory and industry standard specifications for how the encoding is accomplished, which are discussed below and are referred to throughout this specification as ADS-B protocols. Once the data is properly formatted, it is broadcast (transmitted) at specific rates. It is the objective of the present invention to utilize the ADS-B protocol and infrastructure as much as possible by utilizing currently reserved message definitions or by repurposing currently defined messages having a spare data field (spare bits) to broadcast the turbulence reports.

The purpose of ADS-B is to give pilots and air traffic control (ATC) better aircraft positioning data which improves air traffic flow and safety. The ADS-B surveillance system will eventually replace traditional RADAR which has been the foundation of air traffic control of aircraft since the 50s. Aircraft transmit their individual ADS-B (Out) data to other aircraft directly and to ground stations which use it for their own purposes and turn around and re-broadcast (ADS-R) air traffic and other flight data to aircraft. The ADS-B (Out) data is transmitted by the aircraft at 1 Hz. Guidelines/standards/requirements for ADS-B, including message formats, are contained in RTCA docs 242A, 260A/B (ES), 282A/B (UAT) and 14 CFR 91.227. When the term ADS-B message, ADS-B messages ADS-B formatted message or ADS-B messaging are used in this document, it shall mean that the message format is in accordance with protocols and definitions laid out in these documents and/or any other controlling documents. The use of the term 'encode' shall mean the process by which data is formatted and placed into an ADS-B message format for broadcast in accordance with the message structure protocol definitions specified in these documents. Conversely, 'decode' shall mean the process by which data is extracted from the ADS-B message format in accordance with the protocol definitions specified in these documents. In the case of the new ADS-B turbulence messages defined herein, encoding/decoding would be done in accordance with the algorithm described below. The ADS-B communication path between aircraft or between and aircraft and a ground station is frequently referred to as a 'datalink,' and the process by which the data is transferred may be referred to as a 'downlink.'

ADS-B data is re-transmitted by the ground stations back to aircraft also at 1 Hz. The class of data transmitted from the ground station back to the aircraft is referred to a Traffic Information Service-Broadcast (TIS-B). Ground stations also transmit other flight data referred to as Flight Information Service-Broadcast (FIS-B). This FIS-B contains various weather data such as NOTMS and graphical weather for depiction in the aircraft cockpit. While TIS-B is available to both 1090ES and 978 UAT systems, FIS-B is only available to 978 UAT systems. In addition to receiving ADS-R data from the ground stations, aircraft that are within radio sight of each other may receive the data directly from another participating aircraft.

SUMMARY OF THE INVENTION

The invention relates generally to utilizing the existing ADS-B messaging system to communicate sensed turbulence to other aircraft. The invention also includes receiving sensed turbulence reported by other aircraft through the ADS-B system, processing the received turbulence reports, and displaying the reported turbulence data on a cockpit display system. The ADS-B system is used for this purpose on a non-interference basis with existing functionality by utilizing message types which are currently defined as reserved, or by utilizing message types which have unused (spare) data bits. The invention is applicable to both 1090ES and 978 UATADS-B systems.

Received turbulence reports may be displayed as an 'overlay' on existing map formats such as a flight plan stick map. The display of turbulence reports on a map indicates areas of turbulence to be avoided (or areas of calm to be sought out). Several display formats are illustrated.

DETAILED DESCRIPTION

The invention relates generally utilizing the existing ADS-B system to communicate sensed turbulence intensity levels (TB) to other aircraft. The invention also includes receiving sensed turbulence reported by other aircraft through the ADS-B system, processing the received turbulence intensity levels (TB), and displaying the received turbulence data. The ADS-B system is utilized for this purpose on a non-interference basis with existing functionality by utilizing message types which are currently defined as reserved, or by utilizing defined message types which have unused (spare) data bits. The invention is applicable to both 1090ES and 978 UATADS-B systems.

Figure 1:
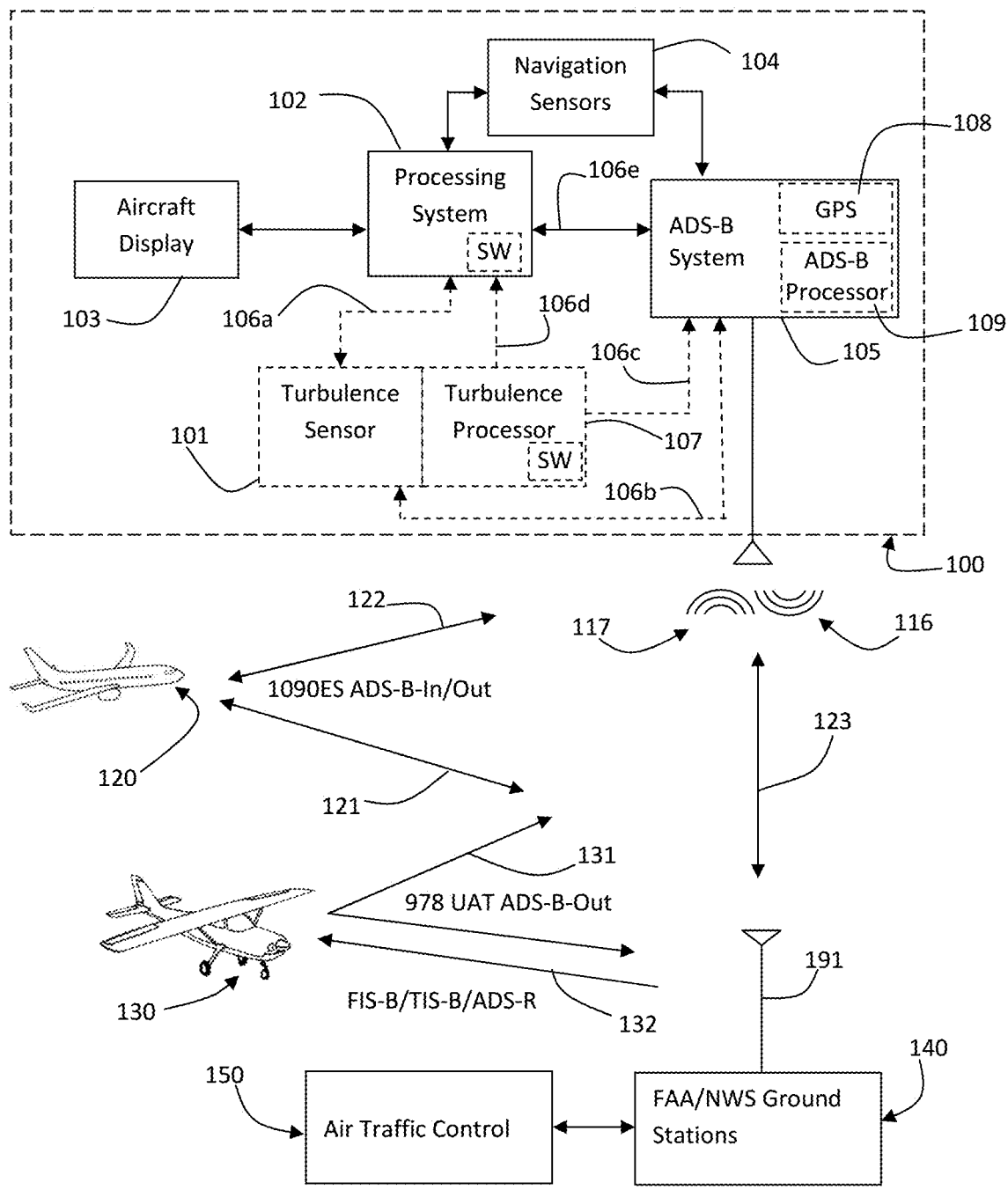
FIG. 1 is a block diagram illustrating major components of the system and method of the invention and its interoperability with other aircraft, the FAA ground station, the ADS-B system, and ATC.

Turning to FIG. 1, the invention contemplates using either a dedicated turbulence sensor 101, or if the aircraft is equipped with an existing sensor 104 capable of detecting turbulence, it may be utilized for this purpose in addition to its nominal function. The invention also contemplates using either a dedicated processor 107 to process the sensed turbulence data or existing on-aircraft processors 102, 109 such that the processing may be added to the functions of the existing aircraft processors 102, 109. For example, the processing might occur in the ADS-B transponder 105. In another embodiment, the turbulence data processing may be done inside the FMS processing unit 102 and forwarded to the ADS-B transponder 105. In still another embodiment, the processing is done in a dedicated processer 107 system separate from both the FMS and the ADS-B system and which may be integrated with the turbulence sensor 101. In any case, the ADS-B processor 109 would encode the turbulence data into an ADS-B message for periodic broadcast.

The output of the processing step is to translate the raw sensed turbulence data into a turbulence intensity level (TB) which may then be encoded into an ADS-B message for reporting. Note that throughout this document when turbulence is discussed, the state of no turbulence (i.e. calm smooth air) is also included. This is because it is just as useful to pilots to know where the turbulence is absent as it is to know where it is present. Note also that turbulence is a 4-D event. Not only are x-y position relevant, but also altitude (z), time of occurrence (t), and duration (TD). The values of position (x, y, and z) and time (t) are all available in standard ADS-B messages. Duration (TD) is something that would need to be computed.

There are numerous ways to quantify the turbulence intensity level (TB). One guide might be the current system of PIREPs. With respect to pilot reports of turbulence intensity, the Aeronautical Information Manual (AIM) (TBL 7-1-10) lists 4 levels of turbulence: light, moderate, severe, and extreme. Although the AIM table does not include 'none' as an intensity category, for the purposes of sensing and reporting turbulence system here, a fifth level, i.e. 'none' would also be included (see Table 1 and FIG. 10a,b discussions below). Turbulence duration (TD) is referenced in the AIM table as occasional, <⅓ of the time; intermittent ⅓<td<⅔; and continuous >⅔. Duration is not always given in PIREPs. (Note: Although the AIM refers to this parameter as 'duration,' the definition is more one of 'duty cycle.' Nonetheless, the AIM term will be used.)

Thus, to emulate the PRIREP system for magnitude, would only need five levels. In the binary sense, this requires three bits of data (Table 1). (Note that while the AIM PIREP analogy defines only 5 levels, clearly larger numbers of gradations are possible.)

TABLE 1

Turbulence

| State | Binary | Intensity Level (TB) |
|---|---|---|
| 0 | 000 | None |
| 1 | 001 | Light |
| 2 | 010 | Moderate |
| 3 | 011 | Severe |
| 4 | 100 | Extreme |

If there is a desire to also quantify the turbulence duration (TD) one additional bit could be added and then enough combinations would allow both TD and TB to be represented (Table 2):

TABLE 2

Turbulence

| State | Binary | Intensity Level (TB) | Duration (TD) |
|---|---|---|---|
| 0 | 0000 | None | None |
| 1 | 0001 | Light | Occasional |
| 2 | 0010 | Light | Intermittent |
| 3 | 0011 | Light | Continuous |
| 4 | 0100 | Moderate | Occasional |
| 5 | 0101 | Moderate | Intermittent |
| 6 | 0110 | Moderate | Continuous |
| 7 | 0111 | Severe | Occasional |
| 8 | 1000 | Severe | Intermittent |
| 9 | 1001 | Severe | Continuous |
| 10 | 1010 | Extreme | Occasional |
| 11 | 1011 | Extreme | Intermittent |
| 12 | 1100 | Extreme | Continuous |

The function of the processing is to convert the sensed data into quantifiable turbulence intensity levels (TB) such as the ones in Table 1, or into intensity levels (TB) and duration (TD) Table 2, as just one example. An algorithm to perform this processing could be coded into processor software and executed at periodic rates so as to produce turbulence intensity level (TB) and duration (TD) which might be transmitted out at a periodic rate. As one example, ADS-B data is currently transmitted at a 1 Hz rate. Turbulence data might be included in the existing ADS-B output stream and transmitted at a 1 Hz rate or might be at some other rate. If some rate slower than 1 Hz is selected, the processor may perform some statistical operation on data sensed between periodic transmissions. For example, the max, average or median value of interim intensity samples could be used as the reported value.

In addition to the detection and broadcast of turbulence data, the invention includes receiving turbulence reports from other aircraft and displaying the data. In one implementation, the data is displayed on a Multifunction Display (MFD) 103. Such devices are common in transport category aircraft and are used to display various data to pilots such as aircraft performance, and navigation and guidance data. Included also are various 'overlays' which present one set of data on top of another, generally over a flight plan stick map. In one exemplary embodiment, the turbulence reports from other aircraft comprise a map overlay.

Figure 11:
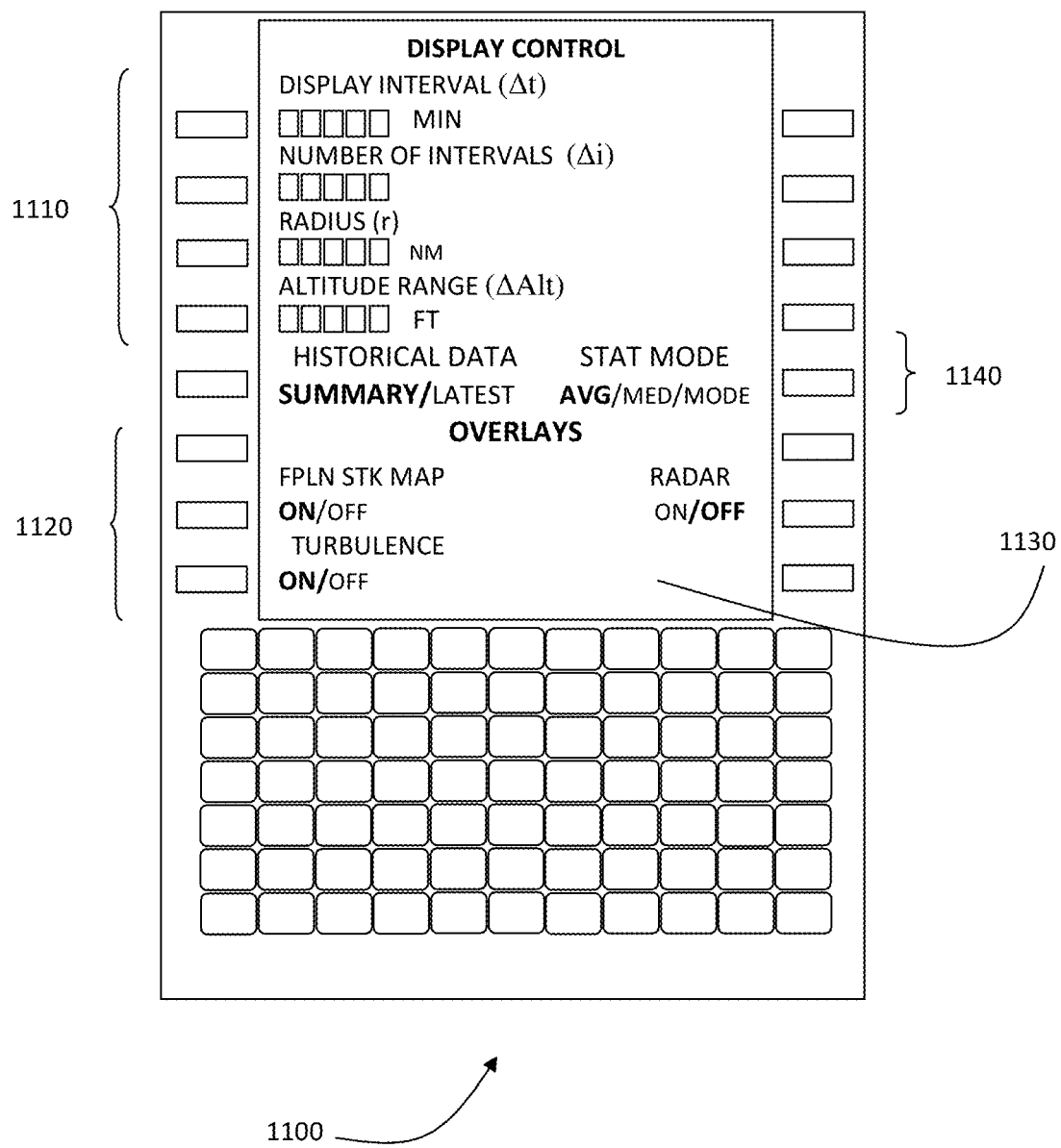
FIG. 11 illustrates an example of an FMS Multifunction Control and Display Unit (MCDU) used for display and operator input.

In addition to the processing of the sensed turbulence data to determine turbulence intensity level (TB) and turbulence duration (TD), there are additional processing functions related to the present invention. First, the processor may perform message formatting functions such as putting the processed turbulence data into a message for communication to the ADS-B system 105. For example, if the turbulence processor is a dedicated processor 107 or an FMS CDU 102, the processed turbulence data might be placed into an ARINC 429 message for communication to the ADS-B system 105. Second, the processor may provide for the display of various control pages. For example, in the case of an FMS system, the MCDU may display various CDU 'pages' [1130, FIG. 11], allowing the pilot to make selections regarding display parameters. Third, the processor may format ADS-B turbulence data received from other aircraft, into messages sent to the display system so that reported data might be displayed to the pilots. Fourth, the processor may perform various analyses of the turbulence data as discussed in more detail below. Software may be utilized in one or more processors for performing these tasks.

As described below in more detail, the ADS-B messaging protocol utilizes a format 'type code' to let the receiver know what type data is encoded in the message so that the receiving processor may apply the proper decoding algorithm. The format type code definitions are listed in the applicable RTCA documents referenced above. The relevant fact here is that a plurality of format codes are designated as 'reserved.'

In one exemplary embodiment, the existing ADS-B message structure is leveraged by utilizing one of the currently reserved 'type codes' to include the turbulence data. The turbulence data is then encoded into an ADS-B (Out) message for broadcast onto the existing ADS-B datalink network as part of the current periodic ADS-B (Out) messaging. It may then be accessed by the FAA ground stations and other aircraft similar to what is done today with existing ADS-B data, using the redefined 'type code' to identify and decode the turbulence data.

FIG. 1 illustrates in block diagram form, an exemplary embodiment of the present invention and how it might be integrated into an aircraft with a Flight Management System (FMS). (While this embodiment/figure uses an FMS system for illustrative purposes, it is noted that the invention is also applicable to aircraft without FMS (see FIG. 3 below)).

As seen in the figure, the turbulence detection and display system (TDDS) 100 may comprise a turbulence detector 101, a turbulence processor 107, and an ADS-B system 105. For completeness and perspective, the figure also shows a central processing system 102, a display system 103, and navigation sensors 104. Although these LRUs are more properly considered part of the FMS, they may also play a role in the turbulence detection and display system (TDDS) 100. In the context of this specification, the terms ADS-B system, ADS-B transponder and ADS-B transceiver will all refer to the line replaceable unit (LRU) which performs the function of receiving navigation and other data from internal or external sources, processing the data, and forming properly formatted ADS-B messages in accordance with applicable regulations as referenced above. The ADS-B LRU 105 may also establish a datalink to other aircraft or ground stations, receiving ADS-B messages, decoding the messages, and forwarding the decoded data to other LRUs such as a display for displaying the received data.

Note that as discussed elsewhere, the functions of turbulence detector 101 and turbulence processor 107 may be accomplished by repurposing existing aircraft equipment to perform the turbulence detection function in addition to their originally designated functions. For example, in the FMS embodiment illustrated in the figure, existing aircraft sensors such as accelerometers or an Inertial Navigation Unit (INS) may provide the necessary sensory data for turbulence detection, and the FMS processor 102 may perform the processing function, obviating the need for a dedicated turbulence sensor.

There are several contemplated interfacing embodiments contemplated by the present invention. In a first exemplary embodiment, turbulence sensor 101 is interfaced directly with FMS processor 102 via path 106a. Turbulence sensor 101 would be adapted to produce a periodic output of raw sensed turbulence data such as accelerations, and would be placed on a bus or connection 106a, such as ARINC 429 bus, which could then be 'read' by a processor such as 102 as is common in the industry. In this embodiment, data processing of the raw turbulence sensor data is accomplished in FMS processor 102. This process may include determining the turbulence intensity level (TB) and turbulence duration (TD) as described above. This processing would be accomplished using software code, sometimes referred to as 'flight code' or 'operational flight program,' which is programmed into the FMS processor 102 as is commonly understood in the industry. The processed turbulence data would then be placed in messages or labels, e.g. ARINC 429 labels, and sent to the ADS-B system 105 using an existing FMS CDU/ADS-B communication path 106e. ADS-B processor 109 would then process the incoming data from the FMS processor 102, encoding it into a property formatted ADS-B broadcast message for transmission to other aircraft or ground stations via datalink and in accordance with standard ADS-B practices.

A sub mode of this first exemplary embodiment is where the turbulence sensor comprises an integrated processor 107 such that the processing for translating raw accelerations into turbulence intensity levels (TB) is accomplished by processor 107. The processed data is made available to processor 102 via connection 106d. In this submode, processor 102 places the processed data onto connection 106e, making it available to ADS-B system 105. ADS-B processor 109 would then encode the data into a property formatted ADS-B broadcast message for transmission to other aircraft or ground stations in accordance with ADS-B protocols.

In a Second embodiment, the turbulence sensor 101 is connected directly to ADS-B system 105 via bus or connection 106b, such as ARINC 429 bus, which could then be 'read' by the ADS-B system 105. ADS-B system processor 109 then accomplishes all of the turbulence data processing described above in connection with FMS processor 102, namely determining the turbulence intensity level (TB) and turbulence duration (TD) as described above. ADS-B processor 109 would then encode the data into a property formatted ADS-B broadcast message for transmission to other aircraft or ground stations in accordance with ADS-B protocols.

Third, a dedicated sensor processor 107 does all processing of the turbulence senor data—likely with the sensor 101 and processor 107 functions being integrated into one LRU. The processed turbulence data would then be placed in messages or labels, e.g. ARINC 429 labels, and sent to the ADS-B system 105, using an existing communication path 106c. ADS-B processor 109 would then process the incoming data from the turbulence processor 107, encoding it into a property formatted ADS-B broadcast message for transmission to other aircraft or ground stations in accordance with ADS-B protocols.

Considerations for choosing between the three implementations include the number of spare transmit and receive ports available on the LRU and the decision as to which LRUs are preferred for required software updates.

In some architectures, ADS-B system 105 may be a 1090 MHz Mode S "Extended Squitter" (ES) transponder or a 978 MHz Universal Access Transceiver (UAT). As is well understood in the art, such transponders/transceivers include internal processors and receiver/transmitters for processing, encoding, and transmitting ADS-B messages to, and receiving ADS-B messages from, ground stations and other aircraft via datalink. The present invention is compatible with both ADS-B configurations.

It should be noted that the figures represent the functional data flows associated with the invention and not a technically complete architecture of an entire FMS system. Thus, in the figures, for simplicity, not all data connections or LRUs are shown. For example, in FIG. 1, data connections between the navigation sensors, air data sensors, and the display system are not shown, although in typical FMS system architecture, those direct connections would exist. Also data flow arrows do not necessarily represent all data flows. Arrows may show unidirectional flow when, in fact, data may flow both ways. Furthermore, as discussed elsewhere, some of the LRUs shown functionally discrete may be combined into a single LRU, e.g. GPS receiver and ADS-B transponder (see FIG. 3).

A central component of a Flight Management System is a processor. This processor may take many forms, but a common form is Multifunction Control Display Unit (MCDU). This is an LRU which provides the pilots with an interface to the remaining components of the FMS for control of the LRUs and display of their data in addition to performing numerous processing tasks such as sensor status and control, navigation and guidance, flight plan management, and performance calculations to name a few. To accomplish all of these tasks, FMS CDU executes software code often referred to as 'flight code' or 'operational flight program' (OFP). Typically an FMS would include at least two MCDUs for redundancy. One would be designated as the pilot's CDU and the other the copilot's. For the purposes here, a single processing system is discussed.

As shown in the figure, the FMS central processing system 102 receives sensor inputs from a variety of sensors. Navigation sensor 104 provides position, ground speed, heading, and track. Turbulence sensor 101 may provide inputs regarding sensed turbulence. In addition to the sensors shown, the aircraft system may comprise other sensors not shown. For example, an air data sensor would provide data such as airspeed, altitude, and pressure. Finally, a display 103 may provide the pilots with a visual display of aircraft data such as flight plan, traffic overlay, weather overlay, performance calculations and the like. In some exemplary embodiments, display system 103 is a Multifunction Display (MFD). Communication between processor 102 and display 103 is normally via a serial bus such as an ARINC 429 bus.

Another task typically performed by the MCDU is message control. The MCDU communicates with many of the LRUs comprising the FMS system. Some communications are for status, control, or data acquisition. Others are primarily for data relay between LRUs. In some embodiments, the processing system 102 may also contain the software necessary for gathering the aircraft data needed for ADS-B messages, such as position, speed, heading, vertical velocity, flight ID etc. and forwarding the data to the ADS-B system 105. In other embodiments, ADS-B system 105 receives data directly from the sensors.

Another task for FMS processor 102 is display control. MCDU 'pages' [1130, FIG. 11] may be presented to the pilot on which certain display control parameters may be selected [1110 FIG. 11]. In some systems, this ability to control display formats [1120 FIG. 11] is shared with the display as well. Such selections/control of the display are discussed in more detail below in connection with the figures illustrating various display configurations.

Flight Management Systems (FMS) typically comprise one or more display systems 103. Display 103 is connected to processing system 102 and is used to display various flight related data to the pilots. For example, in an FMS system, display 103 may be used as a primary flight display (PFD) displaying heading, course, and flight guidance. Flight management system displays typically have numerous 'overlays' that can be selected to show additional data for pilot situational awareness such as graphical weather, flight plan 'stick map,' NAVAIDs, Special Use/Military Operation (SUA/MOA) airspace etc. In several exemplary embodiments, display 103 would be used to show turbulence data reports from other participating aircraft. In exemplary embodiments, the turbulence display would be an overlay selectable from a display menu similar to other display formats (see 321, FIG. 3). Selection of display formats/overlays is usually made on the MCDU [1120 FIG. 11], the display, or a combination of both. The display function of the present invention is discussed more below in connection with FIGS. 4, 5*a-c*, 6*a-b*, 7, 8*a-c*, 9*a-c*.

For ADS-B (Out) compliance, a navigational source including a certified GPS is required. Navigation sensors 104 provide that navigation input. One common example of a GPS found in many transport category aircraft is a global positioning system (GPS) receiver integrated into inertial navigation system (INS) or inertial reference system (IRS). These are generally referred to as embedded GPS INU (EGI). EGI sensor outputs acceleration and attitude in addition to position, speed, and altitude, and may be capable of providing the inputs necessary for turbulence measurement. Smaller aircraft, such as those found in the general aviation segment, typically do not have inertial navigation sensors. Rather, most have panel mounted or other stand-alone (i.e. not integrated with an inertial sensor) GPSs such as those manufactured by Garmin, Bendix/King, and Avidyne. In some cases these GPSs may be integrated with an ADS-B system; in other cases, they may be externally interfaced either directly or via the FMS processor 102. Typically ARINC 429 serial interface is used, but there are other types. GPS only systems would not provide the inputs necessary to measure turbulence and would require the use of a dedicated turbulence sensor.

ADS-B system 105 performs the function of encoding, broadcasting (transmitting), receiving, and decoding the ADS data messages. The FAA has specified two types of ADS-B systems which may be used for compliance. The first is a modification of the 1090 MHz Mode S transponder to include an 'extended squitter' (ES). The 'extension' refers to the additional ADS-B data to be transmitted out. The second means for satisfying the ADS-B mandate is the use of a 978 MHz Universal Access Transceiver (UAT). The UAT option is only legal below 18,000 feet, so all transport category aircraft use the 1090 ES option. The present invention contemplates use in both systems.

As mentioned above, use of the term ADS-B message and ADS-B message format in this document shall refer to messages which are formatted in compliance with the applicable regulations and industry standards referenced above defining the ADS-B message protocols. Similarly, the use of the term 'encode' shall mean the process by which data is formatted and placed into the ADS-B message format and the term 'decode' shall mean the process of extracting the data from incoming ADS-B messages in accordance with the established ADS-B message protocols.

As mentioned above, there are several considerations in selecting an implementation embodiment. One consideration in architecting the interface between the turbulence sensor, the processor, and the ADS-B system is the availability of hardware interface ports. For example, if the ADS-B LRU is lacking any additional input channels, the turbulence input would need to be made through an existing connection. One example is the first exemplary embodiment where the data flows through the FMS processor 102 and onto an established connection between the FMS CDU and the ADS-B transponder.

As shown in FIG. 1, system 100 broadcasts (transmits) ADS-B messages 116 which may be accessed 191 by the FAA ground stations 140. The messages may also be accessed by other aircraft 120 having ADS-B (In) receiving capability. Reception of the ADS-B messages may be either directly from other aircraft or via rebroadcast (ADS-R) by FAA ground stations 140. The FAA ground stations 140 also pass ADS-B data to Air Traffic Control 150 to perform its traffic separation and other responsibilities.

Reception, decoding, and display of turbulence data broadcast by participating aircraft is another feature of the present invention. Aircraft reception of the ADS-B (In) turbulence messages allows the data to be displayed for pilot situational awareness. When overlain on a flight plan map, it indicates whether the current planned route will take it through an area of turbulence. Thus, the pilot is given the opportunity to avoid, if possible, or at least warn passengers and cabin crew, that probable turbulence is ahead. Thus, one important benefit of the present invention is to enhance safety onboard aircraft by providing an advance warning to passengers and crew so that precautions may be taken such as returning to seats, securing seatbelts and having the cabin crew discontinue cabin service and return to their seats.

Turbulence and other ADS-B data messages received by the ADS-B system 105 may be processed by ADS-B processor 109 to decoding the turbulence data from the incoming message stream. As mentioned previously, decoding the ADS-B messages is accomplished by applying the message decoding algorithms in accordance with the regulatory (C.F.R.) and industry standards (RTCA) and other applicable documents or in the case of the new turbulence messages, the algorithms described herein. Once decoded, the ADS-B system would make available the data on one or more of its output ports such as an ARINC 429 port. The FMS processor would be connected to one of the ADS-B output ports and the decoded data read by the FMS processing system 102. FMS processor 102 may then put the turbulence data into a format for sending to the display system 103 for display. It is also possible that the display processing would be accomplished by ADS-B processor 109 and then sent either directly or indirectly to display system 103. In many FMS architectures, connection to the MFDs is by ARINC 429 data protocol. Those in the art will recognize that there are many ways for the turbulence data to be displayed. As one example, it may be displayed as an overlay on a map containing a flight plan stick map. The reception and display functionality is described in more detail below, along with several alternative implementations, in connection with FIGS. 4, 5a-c, 6a-b, 7, 8a-c, 9a-c.

The system 100 establishes data links between other aircraft 122 and ground stations 123. As indicated by the bidirectional data flow arrows 121, 122, and 123, it is expected that numerous other aircraft would be participating in the exchange of turbulence data and would be both providers of data as well as consumers of data through the ADS-B (Out)/ADS-B (In) functionality. The turbulence data might also be made available to general aviation aircraft 130 utilizing the UAT system by including the turbulence reports as part of the FIS-B data stream 132. Also there may be a subset of aircraft which provide ADS-B (Out) data but do not consume turbulence data and, of course, there may be a subset of aircraft which do not include the system modifications necessary to incorporate the turbulence processing described herein.

Figure 2:
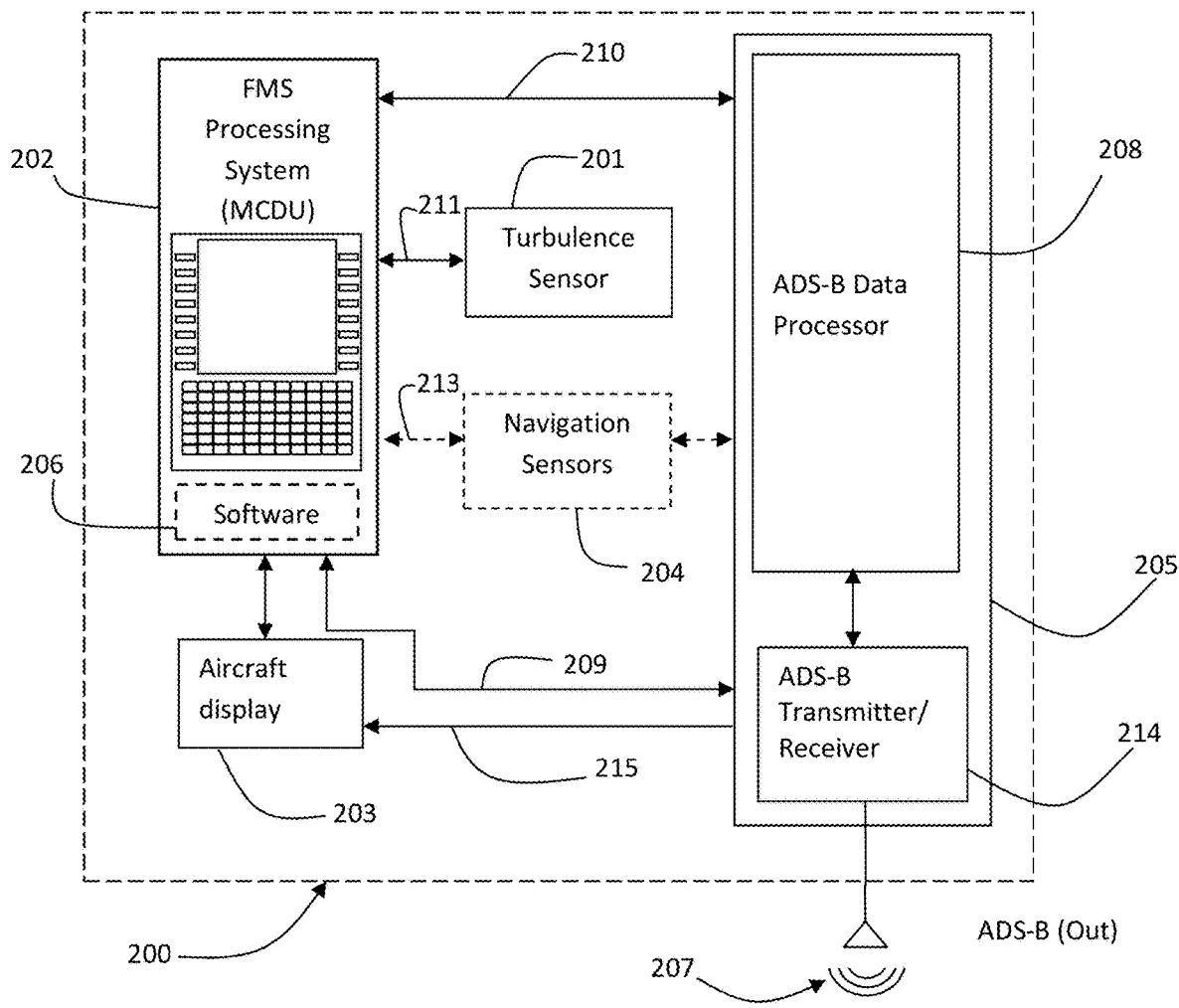
FIG. 2 illustrates additional interface details of an implementation architecture utilizing an ADS-B system such as a 1090ES Mode S transponder or 978 Universal Access Transceiver (UAT).

FIG. 2 illustrates in block diagram form, what is referred to above as the first exemplary embodiment of the present invention wherein the raw turbulence sensor data is sent to the FMS processor 202 for processing and then on to the ADS-B for broadcast.

As seen generally, the turbulence detection and display system (TDDS) 200 comprises turbulence sensor 201, a processing system 202, a display system 203, navigation sensors 204, and an ADS-B system 205 which comprises a processing system 208 and a receiver/transmitter 214. Note that in the figure, the intention is to represent the LRUs relevant to the functioning of the turbulence system. Thus, not all FMS LRUs or connections are shown. In this figure, the turbulence sensor 201 is intended to represent both the case where the sensor includes an integrated processor and the case where it does not. Note that in some exemplary embodiments, ADS-B system 205 is a 1090ES Mode S transponder and in other embodiments it is a 978 MHz Universal Access Transceiver (UAT). In this embodiment, processing system 202 is part of a Flight Management System and may comprise, for example, a Multifunction Control Display Unit (MCDU). When implemented as an MCDU, processing system 202 may additionally comprise user input/output functionality. In one exemplary embodiment, the user input is an MCDU keypad and the user output is an MCDU Liquid Crystal Display (LCD).

As shown in the figure, the central processing system 202 receives sensor inputs from a variety of sensors. Navigation sensor 204 provides position, ground speed, heading, track, and various accelerations. Turbulence sensor 201 provides inputs regarding sensed turbulence. The processing system 202 is connected to ADS-B system 205 to communicate various aircraft data to enable the ADS-B system to encode the data into ADS-B compliant messages for broadcast. Finally, a display 203 provides the pilots with a visual display of aircraft data including turbulence overlays. In addition to the sensors shown, the aircraft FMS system may comprise other sensors not relevant to the present invention.

Processing system 202 comprises the FMS flight software 206 which executes FMS related tasks such as navigation and air data sensor data to provide aircraft navigation position and guidance, flight plan management, and user interface, to name a few, and acts as a conduit for aircraft data needed for ADS-B messages, passing the data to the ADS-B system 205 via path 209.

Regarding functions related to the turbulence function of the present invention, FMS processing system 202 performs processing of the raw turbulence data. Recall that in the first principle embodiment there were two submodes, one where the FMS processor processed the raw sensor data, and the other where the processor acted as a pass-through conduit to the ADS-B system. In the former, the processor would receive the raw data from the turbulence sensor 101, typically through a serial bus such as ARINC 429, and process the data into turbulence intensity levels (TB) and turbulence duration (TD) according to software executed algorithms 206. For example, the acceleration magnitudes could be used to determine turbulence intensity (TB) and an analysis of the magnitude over a time period used to determine duration (TD). It is important that all aircraft analyze the data using the same algorithm to ensure consistent results between aircraft.

In addition to the processing necessary to determine intensity (TB) and duration (TD), the processor performs a number of other functions such putting the processed turbulence data into a message, e.g. ARINC 429, for communication to the ADS-B system 205. Second, the processor 202 may provide for the display of various control pages on the MCDU related to the turbulence function. For example, the FMS MCDU 202 may display various 'pages' [1130 FIG. 11], allowing the pilot to make data management selections regarding the display of turbulence data such as display interval (Δt), number of time intervals (Δi), altitude window (ΔAlt) and the like [1110 FIG. 11] as discussed in more detail below in connection with FIGS. 7 and 8a-c. Third, the processor 202 may format ADS-B turbulence data received from other aircraft into messages sent to the display system 203 so that reported data might be displayed to the pilots. Fourth, the processor 202 may perform various analytical analyses of the turbulence data as discussed in more detail below. Software 206 may be utilized in one or more processors for performing these tasks. Display 203 would be used to show turbulence data reports from other participating aircraft. Examples are discussed below in connection with FIGS. 4, 5a-c, 6a-b, 7, 8a-c, 9a-c.

Regarding ADS-B (In) data received from other aircraft, ADS-B processor 208 would decode incoming ADS-B (In) messages from the ADS-B transmitter/receiver 214 and make them available to other LRUs. ADS-B units typically have a plurality of output serial busses such as ARINC 429 to which LRUs may connect to receive ADS-B data. In one such connection, the ADS-B processor 208 would transmit the decoded data to the processing system 202. Processor 202 may then send the data to the display system 203, making it available for display to the pilots. Alternatively, the received ADS-B data may be sent directly 215 to display system 203. Either way, the pilots may then select various display formats which may include display of the turbulence data received from other aircraft ('other aircraft' turbulence data). User input associated with processor 202 allows the pilot to make various display selections. Display functionality is discussed in more detail below in connection with FIGS. 4, 5a-c, 6a-b, 7, 8a-c, 9a-c.

Figure 3:
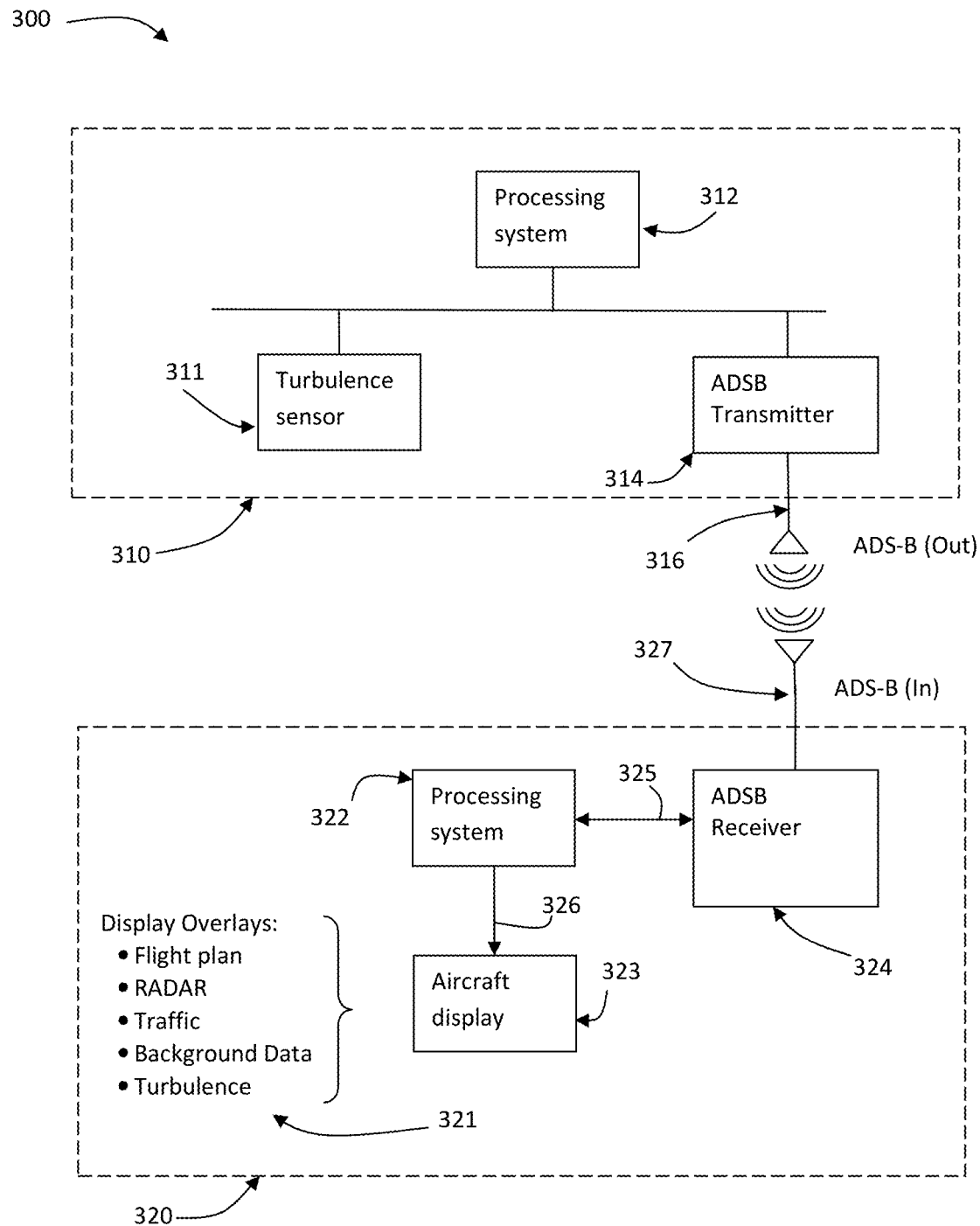
FIG. 3 is a block diagram illustrating the major components on both sides (transmission (Out) and reception/display (In)) of the implementation of the present invention.

FIG. 3 is a simplified block diagram of both the transmitting and receiving functions 300 of the invention illustrating at a high level, the components utilized by transmitting aircraft 310 and receiving aircraft 320. As mentioned above, many of the components of the turbulence transmit, receive, and display function may be part of an aircraft system such as an FMS serving the turbulence system purposes in addition to their primary FMS purpose. As seen generally in the figure, the transmitting function is represented in box 310, and the receiving/display function is seen in box 320. Note that although the transmit and receive functions are shown as separate systems in the figure, this is for functional description purposes and should not be taken as an architectural diagram. For example, the ADS-B transmit and receive functions will frequently be contained in a single LRU such as in an ADS-B 1090ES transponder or Universal Access Transceiver (UAT). Note, too, that although a bus type structure (e.g. MIL STD 1553) is shown, interconnect wiring may in fact be point to point (e.g. ARINC 429) or a combination of both.

The turbulence detection transmitting system 310 comprises a turbulence detector 311, a processing system 312, and an ADS-B transmitter/receiver system 314. Note that in some architectures, ADS-B receiver/transmitter 314 may be part of a 1090ES Mode S transponder or part of a 978 Universal Access Transceiver (UAT) unit. Note that for the purposes of the functional discussion of the system, some of the other functional blocks shown in the earlier figures, such as navigation and air data sensors, have been removed to simplify the discussion.

In one exemplary embodiment, processing system 312 comprises a flight management system (FMS) processor embodied in a multifunction control display Unit (MCDU). The MCDU comprises the FMS flight software, which manages the navigation and air data sensor data to provide aircraft navigation position and guidance. The MCDU also typically manages the flight plan, which may be stored in the computer's memory. The processing system 312 may also contain the software necessary for gathering some of the aircraft data needed for ADS-B messages and passing the data to the ADS-B 314 for encoding into ADS-B messages. As discussed above in conjunction with FIG. 1, there are several options for interfacing the turbulence sensor. For the purposes of FIG. 3, it is sufficient that the turbulence data makes its way to the ADS-B transmitter 314, whereupon the ADS-B processor (not shown) processes the data encoding it into ADS-B broadcast messages in accordance with the algorithms described below.

The receiving and display function 320 begins with reception 327 of the ADS-B (Out) broadcast 316 by participating aircraft. This is sometimes referred to as ADS-B (In) (or FIS-B/TIS-B). The incoming ADS-B messages 327 are unpacked by the ADS-B processor (not shown) in accordance with the industry/regulatory documents cited earlier or in accordance with the algorithm provided below in the case of the turbulence data. The ADS-B processor may then put the decoded data into message traffic such as ARINC 429 labels for communication 325 to the FMS processor system 322. Processor system 322 may reformat the data into messages for the display system 323. For example, FMS processor system 322 may format the data into ARINC 429 display labels and then send the data 326 to the display 323. In one exemplary embodiment, display system 323 is a Multifunction Display (MFD). In addition to the display labels, the processor 322 may also send control labels to the display 323. Such labels may control selection of display formats on the MFD. In one exemplary embodiment, such display selections are made on an MCDU. In another embodiment, they are made using drop-down menus on the MFD. In one exemplary embodiment, the turbulence data could be used as a display overlay 321, which is a common practice in the art where the data may be overlain on another display format such as the flight plan stick map. Selection of the turbulence overlay format may be made on the MCDU as mentioned [1120 FIG. 11].

FIGS. 4, 5a-c, 6a-b, 7, 8a-c, and 9a-c illustrate various display formats contemplated by the present invention. As described below, there are several presentation modes. 'Discrete real-time' mode displays individual data reports are they are received in real time, FIGS. 4, 5a-c, 6a-b, 7, 8a, and 9a. 'Real-time aggregate' aggregates several real-time reports within geographic proximity of each other to summarize the reports with respect to some factor such as altitude, FIGS. 8b-c. 'Historical aggregate' aggregates several historical data reports into a summary report, FIGS. 9b-c. Each of the display formats display the real-time turbulence reports received by a receiving aircraft from a transmitting aircraft using the ADS-B messaging protocol. When plotted on a map, such as an overlay of the flight plan stick map, the display of turbulence reports may indicate areas of turbulence to be avoided (or areas of calm to be sought out). While by no means all inclusive of display possibilities, the figures illustrate features of the invention and some display options.

Figure 4:
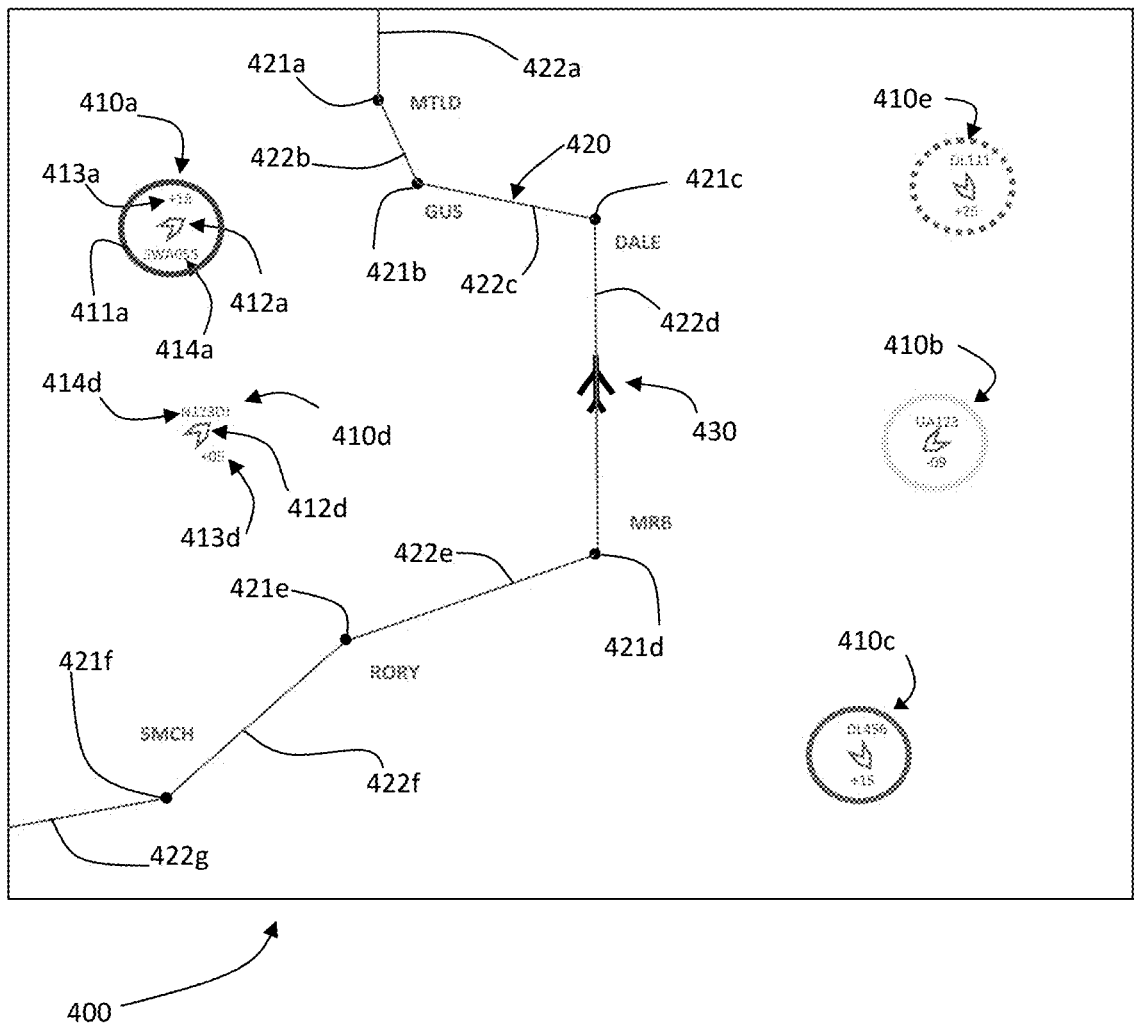
FIG. 4 is an illustration of one embodiment of a spatial display mode showing aircraft reporting turbulence data as an overlay on a flight plan stick map and one embodiment for how turbulence data transmitted by reporting aircraft, might be shown.

FIG. 4 illustrates one possible realization of the turbulence display function of the present invention as it might be implemented on the 'own-ship' aircraft ('own-ship' aircraft is used here to distinguish the aircraft on which the display is located and is to be distinguished from the aircraft whose data is being displayed, referred to as 'other ship' or 'reporting aircraft'). The display 400 comprises a flight plan stick map 420 comprising a plurality of flight plan waypoints (421a-f) defining the plurality of flight plan legs (422a-g). The aircraft icon 430 on the stick map represents the position of the 'own-ship' aircraft.

A plurality of reporting aircraft (410a-d) are shown on the display. The term 'reporting' aircraft will designate aircraft which are transmitting real-time ADS-B (Out) data being received by the 'own-ship' aircraft. One exemplary embodiment of the ADS-B turbulence mapping function employs a circle drawn around the reporting aircraft, the color of which is indicative of its real-time reported turbulence intensity level (TB). One example seen in the drawing figure is aircraft 410a. Aircraft 410a is shown reporting its position 412a, its relative altitude 413a, and its ident 414a. This aircraft is also reporting its real-time turbulence intensity level (TB) 411a. As mentioned above, the AIM currently indicates four levels of turbulence. Color indication of the levels might be GREEN, YELLOW, RED, and PURPLE for light, moderate, severe, and extreme turbulence intensity levels (TB) respectively. Obviously this is but one example; other color schemes may be chosen.

Not all ADS-B (Out) aircraft would necessarily be reporting turbulence data. For example, consider the situation represented in FIG. 4 where there is an aircraft 410d reporting position 412d, altitude 413d and ident 414d but without turbulence data. This case needs to be distinguished from the situation when an aircraft is reporting turbulence data but the sensed turbulence intensity level (TB) is zero. One obvious suggestion is that a non-reporting aircraft would have no circle, and an aircraft reporting zero level of turbulence would have a circle of a color representing zero turbulence. Another possibility is that the aircraft reporting zero turbulence could have a dashed circle of green color such as shown by aircraft 410e. There are many possible alternatives, the important point being to distinguish the two cases. In the figure, aircraft 410d is shown with its ADS-B (Out) data but without any circle, indicating no turbulence data being reported. Aircraft 410e indicates a valid report of zero turbulence as indicated by the dashed green circle.

Aircraft 410*b* with a solid yellow circle is reporting a moderate level using the above color coding example.

The situation represented in FIG. 4 is the instantaneous reporting of turbulence data; that is to say that the data display is current that instant. The aircraft icon positions and other data would be refreshed each time the reporting aircraft sends out a broadcast (1 Hz). For example, with each update, the position of the aircraft icon, altitude, ident and turbulence indicator would be repositioned on the MFD screen. This is illustrated in the sequence in FIGS. 5*a-c*. In the ADS-B system, position is updated once per second. This might present a bit of an issue with turbulence reporting.

Since turbulence is often very transitory, it is possible that turbulence could be sensed for a few seconds, then subside for a few seconds, then resume again. In a worst case, this could cause the turbulence display indicator to change rather rapidly on the display from one color to another or flashing in and out. While the reporting of ADS-B data is nominally 1 Hz, reporting of turbulence data may or may not be at the same rate. Thus, regardless of the reporting frequency, it is likely desirable that the display of turbulence intensity level (TB) be modulated in some manner. Some examples are to integrate the sensed value over some period of time, compute some period average, or median value or the like. The processing system may have software which receives pilot data management inputs controlling the analytical data computations and which performs such analytical computations on the turbulence data in response to the data management inputs prior to sending the data to the display. The output of these computations would still be considered 'real-time' reported data in the context of this specification.

Figure 5A:
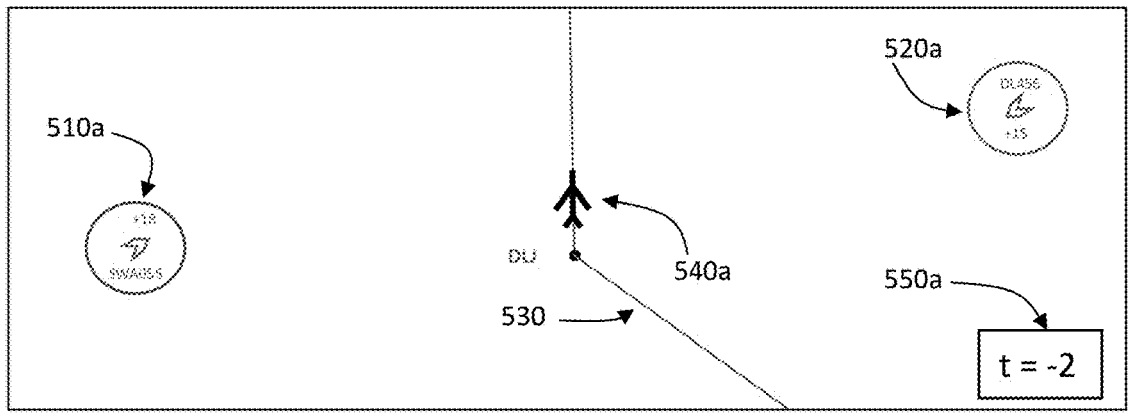
FIGS. 5a-c are a chronological series illustrating an exemplary spatial display embodiment showing a sequence of aircraft data over a period of time.
Figure 5B:
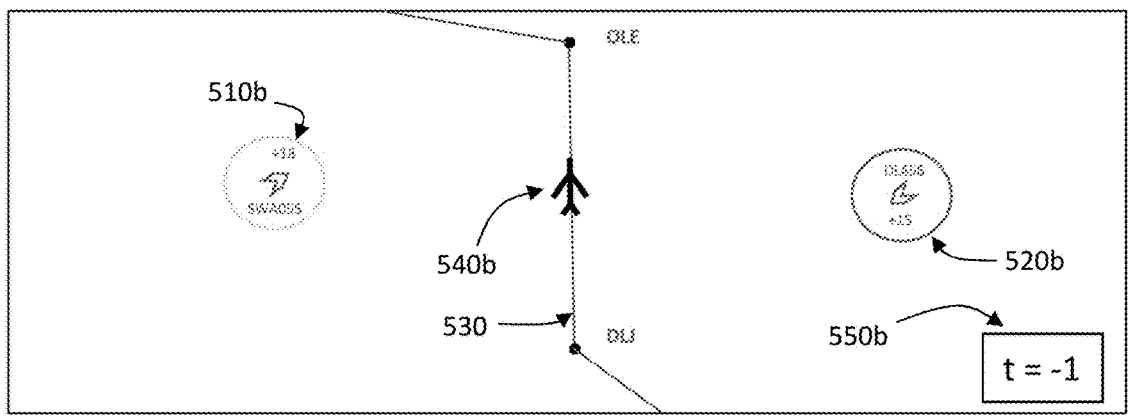
Figure 5C:
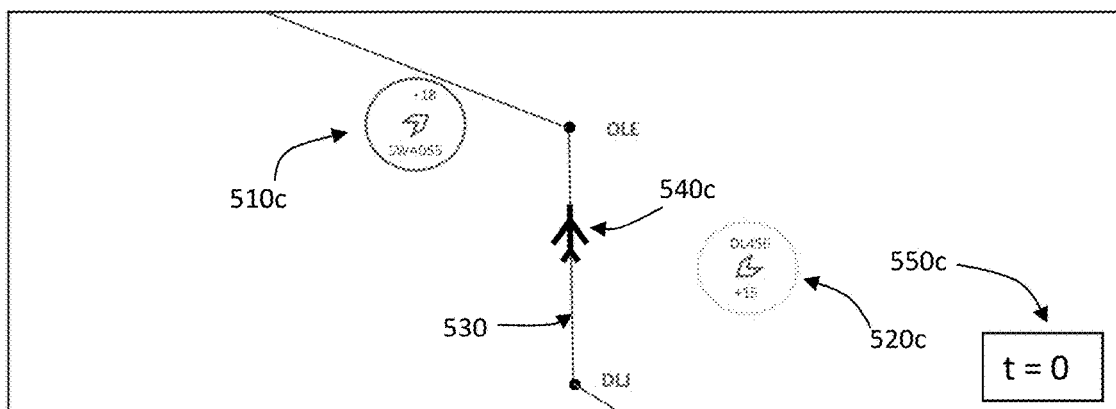

While FIG. 4 illustrates a display of a snapshot of the situation at a single instant in time, FIGS. 5*a-c* show how the display might change over several time periods. Before discussing the figures, the following convention is noted when discussing time based events: $t=0$ ($t_0$) will represent the current time; $t=-1$ ($t_{-1}$) will represent the time interval immediately preceding $t=0$ ($t_0$); and $t=-2$ ($t_{-2}$) will represent the time interval immediately preceding ($t_{-1}$) and so on.

FIGS. 5*a-c* are time lapse illustrations of one example of the turbulence display showing the maps as a function of time. FIG. 5*a* represents the situation at $t=-2$ ($t_{-2}$), FIG. 5*b* represents the situation at $t=-1$ ($t_{-1}$), and FIG. 5*c* represents the situation at $t=0$ ($t_0$), i.e. current time. In the figure, the 'own-ship' aircraft 540*a-c* is shown fixed with respect to the display as is customary in aircraft centered, moving map formats. The flight plan stick map 530, as well as the reporting aircraft 510*a-c*, 520*a-c*, are shown to move relative to the 'own-ship' aircraft. Own-ship aircraft (540*a-c*) and the reporting aircraft (510*a-c* and 520*a-c*) are shown at sequential times as indicated by the time box 550*a-c* at the lower right corner of the display. At $t=0$, the own-ship aircraft and reporting aircraft are shown at positions 540*c*, 510*c*, and 520*c* (FIG. 5*c*). Subsequent time positions are shown at 540*b*, 510*b*, and 520*b* ($t=-1$) (FIGS. 5*b*) and 540*a*, 510*a*, and 520*a* ($t=-2$) (FIG. 5*a*). In addition to the positions moving, a change in the sensed turbulence is also shown, indicating a geographical dependence. For example, reporting aircraft 510*a-c* is shown as flying toward ever decreasing turbulence intensity levels (TB) by the change in color of the reporting rings from RED 510*a* to YELLOW 510*b* to GREEN 510*c*. Conversely reporting aircraft 520*a-c* is shown as flying toward increasing turbulence. As mentioned above, rather than updating the displayed turbulence level every reporting interval, it might be desirable to modulate the changes in displayed turbulence intensity level (TB) due to the transitory nature of turbulence. Such modulation could be in the form of a smoothing filter of some kind such as taking the average of several readings over an interval, using the median value in the interval, using the max value in the interval, etc. It might also be desirable to maintain a record of any reports of severe or extreme turbulence reports so that they may be displayed on any maps for extended periods of time, even long after the reporting aircraft have exited the area.

In FIGS. 5*a-c* the real-time turbulence report indicators are shown overlaid on a flight plan stick map 530. It might also be desired to include an overlay option with graphical weather or RADAR. Such an example is shown in FIGS. 6*a-b*.

Figure 6A:
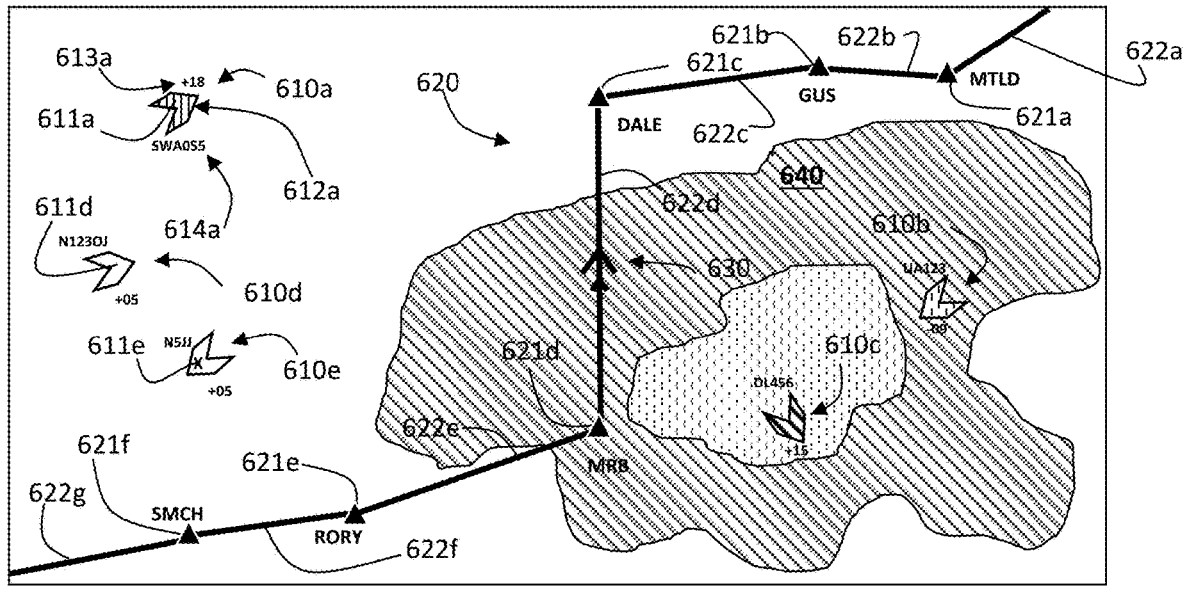
FIGS. 6a-b illustrate alternative spatial display embodiments for representing turbulence data reported by participating aircraft and how it would work with a weather overlay.
Figure 6B:
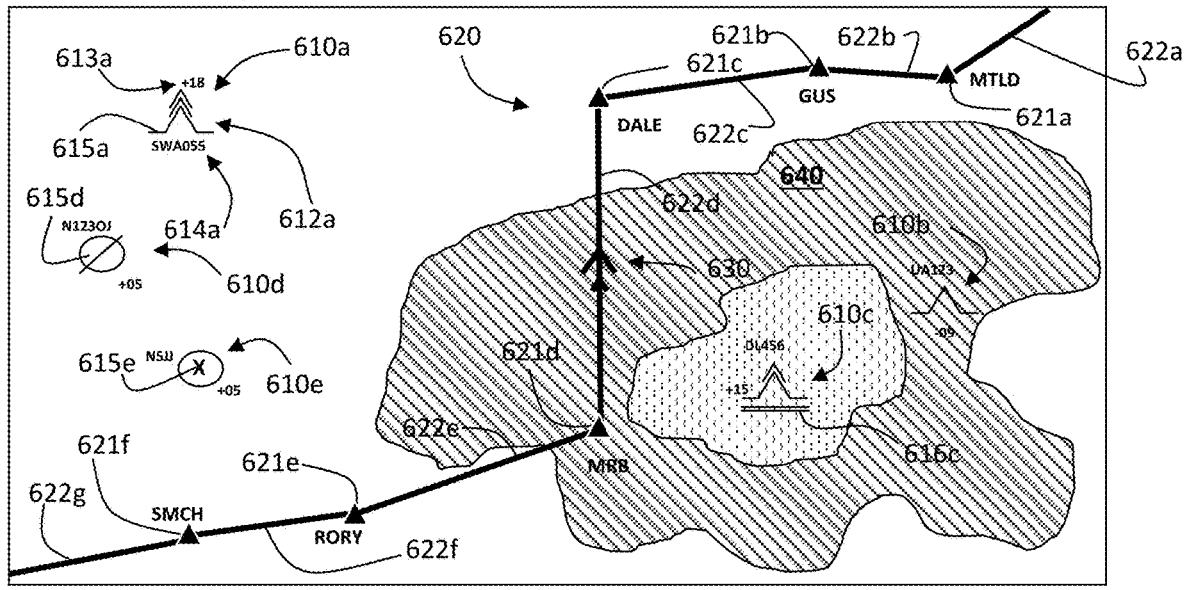

FIGS. 6*a-b* illustrate a display implementation of the present invention where the turbulence overlay is combined with a RADAR overlay of a flight plan stick map. Also, two different turbulence intensity indicators are illustrated in the two figures. The graphical representations in 600*a* and 600*b* comprise a flight plan stick map 620 having a plurality of flight plan waypoints (621*a-f*) defining a plurality of flight plan legs (622*a-g*). The aircraft icon 630 on the stick map represents the position of the 'own-ship' aircraft. A graphical weather RADAR overlay 640 is shown. As is well understood in the art, with typical RADAR overlays, different color shadings typically indicate different precipitation intensities. A plurality of reporting aircraft (610*a-d*) are shown on the display. As described above, the term 'reporting aircraft' will designate aircraft which are transmitting out ADS-B data messages being received by the 'own-ship' aircraft for display. By overlaying the weather RADAR and turbulence reporting graphics, pilots are able to correlate areas of precipitation with reports of turbulence.

FIG. 6*a* illustrates a first alternative method of indicating turbulence intensity levels (TB). In FIGS. 4 and 5*a-c*, colored circles around reporting aircraft were used to indicate turbulence intensity levels (TB). However, the use of the color shading to represent precipitation levels in a RADAR overlay might make it difficult to see colored circles around the reporting aircraft. Thus, an alternative to the colored ring is to use the fill color of the aircraft icon, e.g. 611*a*, as the indicator of the sensed turbulence intensity level (TB). Other possibilities include icon shape or icon border to name just a couple. A second alternative indicator is discussed below in FIG. 6*b*. In FIG. 6*a*, aircraft 610*a* is shown reporting its position 612*a*, its relative altitude 613*a*, and its ident 614*a*. This aircraft is also reporting its sensed turbulence intensity level (TB) 611*a* by using icon fill color.

Another situation represented in the figure is an aircraft 610*e* which might be reporting position, altitude, and ident, but without turbulence data. This case needs to be distinguished from the situation when an aircraft 610*d* is reporting turbulence data, but the sensed turbulence intensity level (TB) is zero. Using the icon fill color implementation (FIG. 6*a*), one suggestion is that a non-reporting aircraft 610*e* would have an 'X' fill for its displayed icon, e.g. 611*e*. An aircraft 610*d* reporting a turbulence intensity level (TB) of zero would have WHITE fill color for its displayed icon with a dark outline, e.g. 611*d*. There are many alternative combinations (see FIG. 6*b*), the important point being to distinguish the two cases.

FIG. 6*b* illustrates another alternative symbology for turbulence indicators. In FIG. 6*b*, all map features such as flight plan stick map, waypoint and RADAR mapping remain the same as in FIG. 6*a*; the only difference is in the turbulence indicators. Instead of being represented by color filled icons, the indicator is similar to the indicator used on the National Oceanic Atmospheric Administration (NOAA) aviation weather charts to indicate Pilot Reports (PIREPs) of turbulence, to wit:

TABLE 3

| Turbulence Level | Binary | Turbulence Description | Map Symbol |
|---|---|---|---|
| — | — | No report | ⊗ |
| 0 | 000 | None | ⌀ |
| 1 | 001 | Light | ∧ |
| 2 | 010 | Moderate | ⋀ |
| 3 | 011 | Severe | ⋀ |
| 4 | 100 | Extreme | ⋀ |

In FIG. 6b, aircraft 610a is shown reporting its position 612a, its relative altitude 613a, and its ident 614a all the same as in FIG. 6a. However, in FIG. 6b, the aircraft is also reporting its sensed turbulence intensity level (TB) (extreme) 615a by using the turbulence symbol from Table 3. Similarly for aircraft 610b, 610c, and 610d, reporting turbulence intensity levels (TB): light, moderate, and none respectively.

Similar to the discussion above in connection with FIG. 6a, the symbology must distinguish between the case where no turbulence report is available and the case where a report is available but the reported level is zero. Table 3 provides indicators to distinguish the two cases. In FIG. 6b, aircraft 610e is reporting position, altitude, and ident but is not reporting turbulence data 615e. Conversely, aircraft 610d is reporting turbulence data, but the sensed turbulence intensity level (TB) is zero 615d. As seen in the figure, a non-reporting aircraft 610e has an 'X' placed in the center of the circle icon, e.g. 615e, to indicate no report is available. Aircraft 610d is reporting a turbulence intensity level of zero, indicated by the 'slash' (/) through the circle icon 615d.

One additional consideration for the indicator embodiment of FIG. 6b, in contrast to FIG. 6a, is that there is no indicator of aircraft heading. In FIG. 6a, the aircraft icon symbol, in addition to providing a means for indicating reported turbulence intensity level (TB) (by fill color), also provides an indication of heading (by icon orientation). Since this is missing in the embodiment of FIG. 6b, it might also be desirable to provide an arrow or other such indicator of aircraft heading. In another exemplary embodiment, a turbulence duration indicator may be added to the intensity indicator. In one embodiment, a single 'underscore' or 'underline' is added for an 'occasional' duration, and a double 'underscore' or 'underline' is added for a 'continuous' duration. No additional indicator is used for 'intermittent' duration. See 616c in FIG. 6b as an example of the 'continuous' indicator.

In addition to the traditional aircraft centered moving map format illustrated in FIGS. 4, 5a-c, and 6a-b, the invention contemplates a mapping method wherein the display is geographically fixed. In this view, a series of aircraft reports are displayed over an operator selectable interval.

Figure 7:
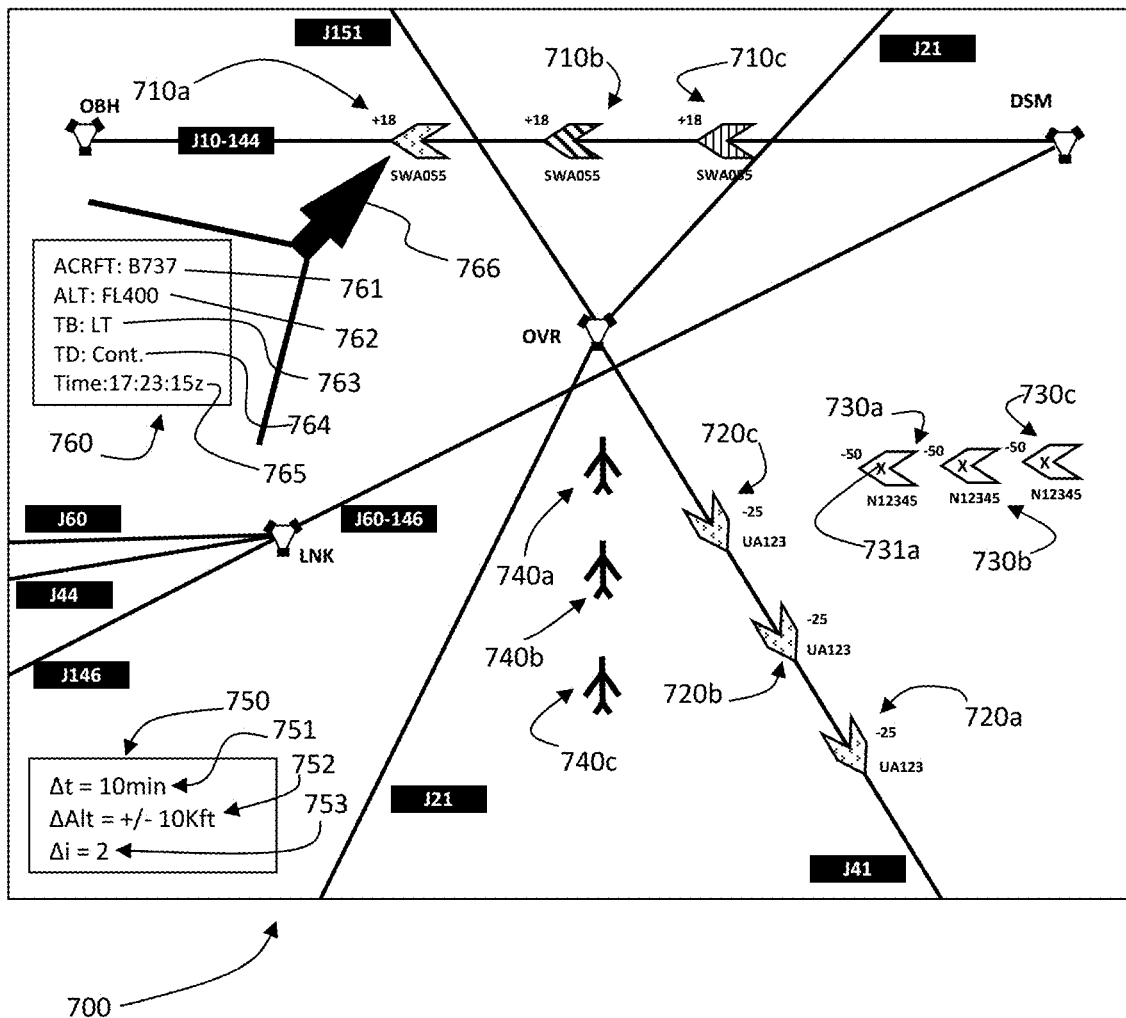
FIG. 7 illustrates an alternative spatial display embodiment of turbulence data display by reporting aircraft during a time sequence.

FIG. 7 illustrates an embodiment of the present invention where a plurality of data measurements associated with an aircraft is shown. The graphical representation 700 comprises an overlay showing major jet routes in the vicinity of own-ship aircraft 740a-c. The representation of the jet routes is but one of the many overlays that could be employed. Others, as illustrated above, might be flight plan overlay and weather overlay to name just two. In this geo-centric display mode, fixed objects remain in the same position and moving objects transition through the display window. For example, in FIG. 7, the navaids and jet routes remain in fixed positions, while the aircraft icons move about the display space in accordance with their reported positions at different times. For example, aircraft icon 740a-c on the stick map represents the position of the 'own-ship' aircraft at times $t_0$, $t_{-1}$, and $t_{-2}$.

As further seen in the figure, a plurality of reporting aircraft (710a-c, 720a-c, and 730a-c) are shown on the display in different time correlated positions. As just one example, using the time labeling convention discussed above, let $t_0$ be the current time, $t_{-1}$ be the next most recent time, $t_{-2}$ the time interval before $t_{-1}$, and $t_{-3}$ the time interval before $t_{-2}$ and so on up to $t_{-n}$ where n is the number of display intervals ($\Delta i$). Time correlated positions of the reporting aircraft are then "a," "b," and "c" representing the positions of the reporting aircraft at $t_0$, $t_{-1}$, and $t_{-2}$ respectively. For example 710a, 710b, 710c represent the position of reporting aircraft 710 at $t_0$, $t_{-1}$, and $t_{-2}$ respectively. The same convention applies to reporting aircraft 720 and 730. The reporting aircraft shown in FIG. 7 utilize the turbulence indicator illustrated in FIG. 6a; i.e. the fill color of the aircraft icon, e.g. 710a, b, c is indicative of the sensed turbulence intensity level (TB) at that time. So for example, the icon fill color of 710c represents the turbulence sensed by aircraft 710 at time 'c' or t=-2. Also of note in the figure is the representation of a reporting aircraft which is transmitting ADS-B (Out) data but not turbulence data, i.e. 730a, b, c. The lack of reported turbulence data is indicated with a 'X' icon fill 731a.

The time interval of display reporting ($\Delta t$) and number of intervals ($\Delta i$) may be pilot configurable parameters. Such configuration selections might be made from an MCDU 'page' in an FMS system [1130 FIG. 11]. For example, he might choose an interval of 10 minutes ($\Delta t=10$ min) and display interval of 2 ($\Delta i=2$) [1110 FIG. 11]. In the ADS-B system, the position reporting is updated at one second intervals which at jet speeds equates to a travel distance of approx 700 feet. Depending on the display range setting, that might produce a confusingly large number of displayed data points. Therefore, the display function may also provide the pilot with a filtering factor. As mentioned above, various filters/selections might be employed to mitigate the potentially confusing display of showing each turbulence intensity level update. For example, he might choose to employ a ten minute filter such that the display represents turbulence data displayed at ten minute intervals ($\Delta t=10$ min) with interim data averaged or other statistical operation performed. (Note the difference between displayed interval and reporting interval. The FAA may designate the ADS-B system turbulence message reports are made at one second intervals from every aircraft, but the own-ship pilot might choose to display data in his aircraft from other reporting aircraft at another rate). As another example, the pilot may employ an altitude filter. For example, he may choose to only display data for aircraft within 10,000 feet of his current altitude. For illustration simplicity, FIG. 7 illustrates three data points ($\Delta i=2$). For pilot awareness, a display parameter box 750 might be displayed indicating the current state of various display control filters/selections such as display reporting interval ($\Delta t$) 751, display altitude filter ($\Delta$Alt) 752, and number of display intervals ($\Delta i$) 753. Reselection/modification of a display control parameter may be accomplished by placing the cursor over the value and clicking or by menu selection or through selection on an MCDU 'page' [1130 FIG. 11] or other similar function.

Another feature of the exemplary embodiment of FIG. 7 utilizes a display cursor. Many FMS displays provide an on screen cursor for pilot selections and the like. As illustrated, if the pilot places the display cursor 766 on or immediately adjacent an aircraft reporting point, e.g. 710a, a pop-up window 760 may be opened to provide a textual display of the reported data. As seen in the figure, the displayed textual data may include reporting aircraft type 761, reporting altitude 762, reported turbulence intensity (TB) 763, reported turbulence duration (TD) 764, and reporting time 765. Each of these items is important when evaluating the relevance of the report to the own-ship aircraft.

A central feature of the display overlay shown in the figure is the presentation of historical data. Since the reporting aircraft are moving over the selected time interval, from position 'c' to position 'a,' it is an indicator of the geographical dependence of the turbulence. Additionally, it may also indicate the time dependence of the turbulence if the interval is sufficiently long there are several aircraft passing through a particular location, see FIG. 8 below.

In the case of illustrating geographical dependence, reference is made to FIG. 7. In this example, using reporting aircraft 710 and a display interval ($\Delta i$) of 2, it is seen that the aircraft has given three sensed turbulence reports at positions 710a, b, and c. At a display interval of 10 minutes ($\Delta t=10$ min), this equates to a display interval of 20 minutes between reports 'a' and 'c.' Assuming a jet speed of 8 miles/minute, the report positions cover a distance of approximately 160 miles. Obviously as the display reporting interval ($\Delta t$) or number of display intervals ($\Delta i$) increases (the other being held constant), so, too, does the measurement distance. As can be seen in the example, in addition to the icon position changing, the icon fill color has also changed, indicating a change in sensed turbulence intensity level (TB) as the reporting aircraft has flown along the airway from position 'c' to position 'a.' In addition to the 'raw' display formats, where data is presented as received, the invention contemplates a number of 'analytical' display modes as well. As mentioned above, the processing system would comprise software which would allow for pilot input controlling various display modes and control of analytical tasks performed on the turbulence data.

Figure 8A:
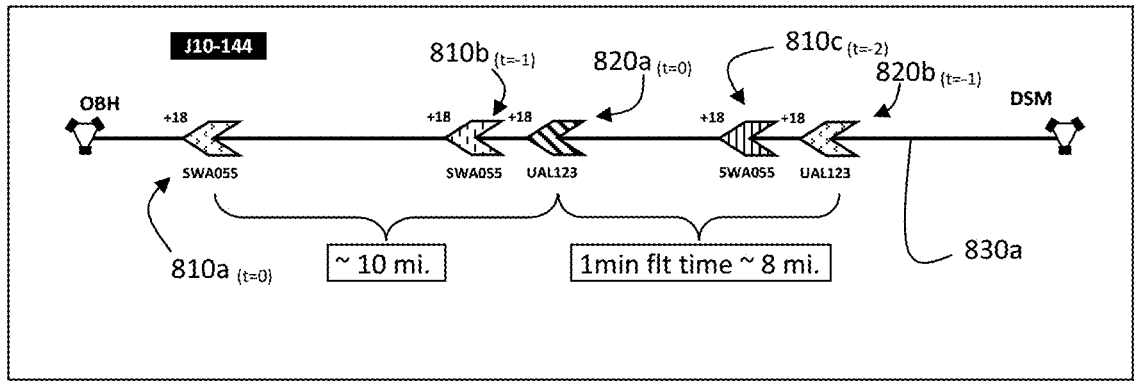
FIGS. 8a-c illustrate spatial and temporal display modes of a series of reported data from multiple reporting aircraft.
Figure 8B:
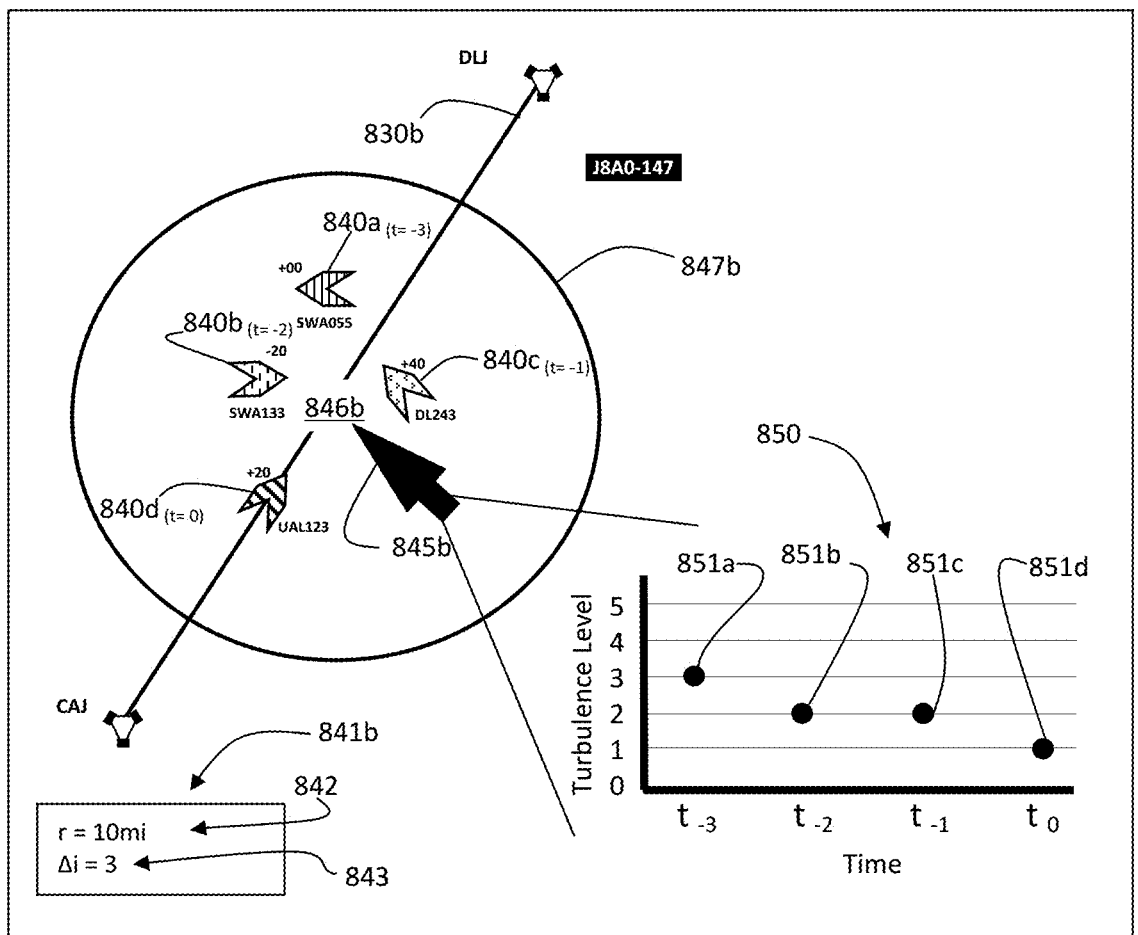
Figure 8C:
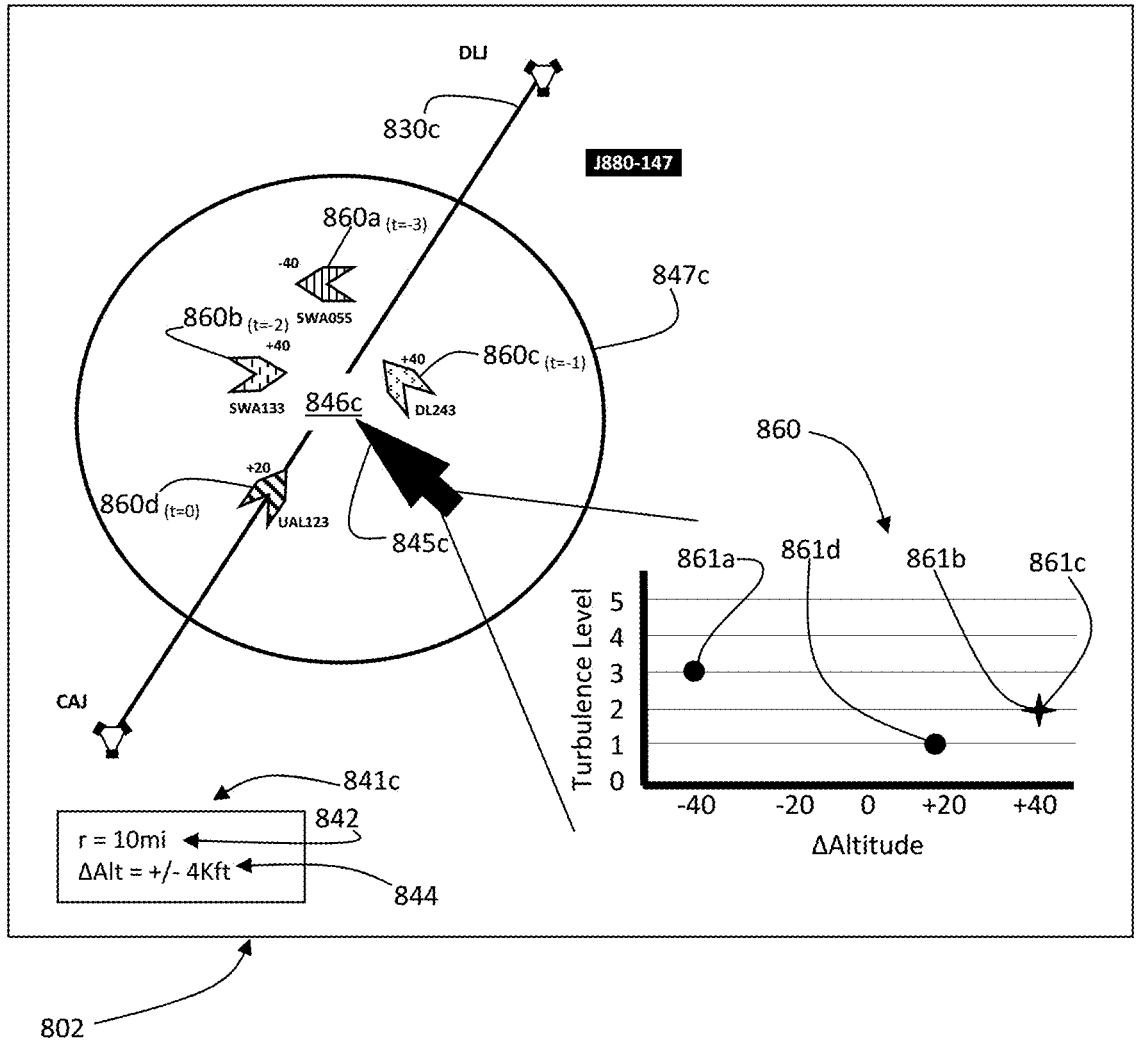

As examples of the analytical display modes, FIGS. 8a-c illustrate some additional display options. FIG. 8a illustrates a plan view of how reported turbulence data might be reported as an overlay on a portion of a flight plan stick map. FIG. 8b also shows reported data as an overlay on a portion of a flight plan stick map and in addition, a graphical representation of the temporal dependence of that data. It is well known that turbulence can be quite altitude specific. Thus, as an additional embodiment, FIG. 8c shows the reported data overlain on a flight plan stick map and in addition, a graphical representation of the vertical (altitude) dependence of the data. These analytical display modes may be selected via pilot input as discussed above.

FIG. 8a represents an example of a spatial display mode with multiple aircraft on an airway showing two reporting aircraft 810 and 820. For illustration of this feature, we will assume that there are two aircraft flying the same jet route 830a, in the same direction at the same speed and altitude with the trailing aircraft (820) approximately 10 miles in trail of lead aircraft (810). At time $t_0$, both aircraft are at position 'a' with UAL123 (820a) approximately 10 miles in trail of SWA055 (810a). For purposes of illustration, we will assume the display time interval ($\Delta t$) is one minute (data points selected for display separated by 1 minute intervals) equating approximately to eight miles (aircraft speed assumed 8 mi/min); it is also seen that the UAL aircraft is approximately 2 miles behind where the SWA aircraft was at time $t_{-1}$. Since data points 810b and 820a are geographically proximate, the difference in turbulence (indicated by the difference in aircraft icon fill) is indicative of how the turbulence has evolved at this geographical point during the time interval $t_{-1}$ to $t_0$ (1 minute interval). Clearly, this is a small interval for analyzing the time dependence of turbulence but illustrates the variable factors. Again these data management control factors and presentation variables may be changed using an operator interface, for example, on an MCDU 'page' [1130 FIG. 11] or using menus on the MFD or the like.

Clearly, if the display time interval ($\Delta t$) or the number of display intervals ($\Delta i$) is expanded on a crowded airway, the display of numerous reporting aircraft icons could become distracting. An analytical time domain display mode addresses this issue. The time domain display mode FIG. 8b performs an analysis with factors including time, position and sensed turbulence. The data analysis would be performed in the FMS processor.

FIG. 8b illustrates one method by which reported turbulence data might be analyzed and displayed based on temporal dependence. Selection and control of these display modes and analytical parameters and presentation variables may be made through the processor system such as on MCDU 'pages' as is commonly done in FMS systems [1130 FIG. 11]. The processor may store reported data for a period of time to accommodate analysis. In the example of FIG. 8b, the stored turbulence data to be analyzed might be displayed as a graph 850 of turbulence versus altitude.

As shown in the figure, a plurality of reporting aircraft 840a-d are displayed. Each of these displayed data points have a reporting time stamp. In the example illustrated, the time stamps range from $t=-3$ to $t=0$. Using the same definitions as cited above, this corresponds to current time ($t=0$) and three prior measurement intervals ($t=-1, t=-2,$ and $t=-3$). This data is plotted in the graph 850 according to the following:

TABLE 4

| Reported Data | Time | Turbulence Level (TB) | Plotted Data Point |
|---|---|---|---|
| 840a | t = −3 | 3 | 851a |
| 840b | t = −2 | 2 | 851b |
| 840c | t = −1 | 2 | 851c |
| 840d | t = 0 | 1 | 851d |

In this implementation, the pilot might move his display cursor 845b over to the region of interest 846b. Upon placement of the cursor 845b, the display might cause a window 850 to be opened, responsive to pilot display control selection, displaying the temporal dependence of the data. Data points 851a, 851b, 851c, and 851d represent the sensed turbulence intensity levels (TB) of the aircraft proximate to the cursor, graphed as a function of time.

Clearly, there are numerous control variables 841b affecting the display, such as the radius (r) 842 of the circle 847b defining the aircraft considered proximate to the cursor 845b selected for graphing and the temporal window ($\Delta i$) (i.e. number of reporting intervals) 843 within which the data is selected for graphing. As mentioned, in an exemplary embodiment, these data management control factors and presentation variable selections may be made through a combination of MCDU page selections [1110 FIG. 11] or from actions on the display itself such a 'right clicking' and selecting from a 'drop down' control window. In some exemplary embodiments, a display window such as 841b may be displayed within the display frame to remind the pilot of display selections active.

FIG. 8c is similar to 8b, except that the extended display 860 illustrates the dependence of the reported turbulence on altitude. Similar to FIG. 8b, a plurality of reporting aircraft 860a-d are shown overlain on a flight plan stick map 830c. The cursor 845c is placed in an area of interest 846c which then pops-up window 860 displaying the reported data as a function of altitude. The graph plots the reported data as reported turbulence intensity level (TB) versus 'delta altitude' (ΔAlt). The ΔAlt is reported in hundreds of feet, so a display of "+20" indicates that the reporting aircraft is 2,000 feet above the own-ship aircraft. In the exemplary display, the ΔAlt of the reporting aircraft range from −40 to +40. It is noted that when multiple aircraft data reports overlap, such as with 861b/c, an alternative symbol such as a 'star' may be used to illustrate the overlap. The reported data is shown in the following table:

TABLE 5

| Reported Data | ΔAlt | Turbulence Level (TB) | Plotted Data Point |
|---|---|---|---|
| 860a | −40 | 3 | 861a |
| 860b | +40 | 2 | 861b |
| 860c | +40 | 2 | 861c |
| 860d | +20 | 1 | 861d |

As mentioned above in connection with FIG. 8b, there are numerous variables 841 affecting the display, such as the radius (r) 842 of the circle 847c defining the aircraft considered proximate to the cursor 845c selected for graphing and the altitude window (ΔAlt) (i.e. the max and min Δaltitude for display) 844 within which the data is selected for graphing. In some exemplary embodiments, these selections may be made through a combination of MCDU page selections [1110 FIG. 11] or from actions on the display itself such as 'right clicking' and selecting from a control window such as a 'drop down' menu or the like. In some exemplary embodiments, a display window such as 841c may be displayed within the display frame to remind the pilot of display selections active.

Figure 9A:
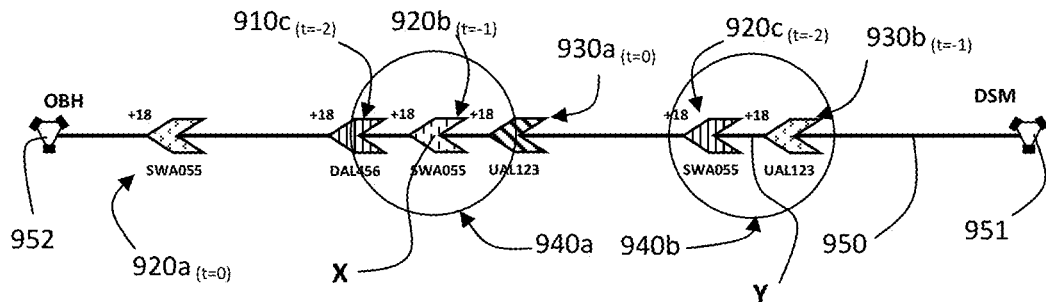
FIGS. 9a-c illustrates how multiple aircraft reported data might be summarized for pilot display.
Figure 9B:
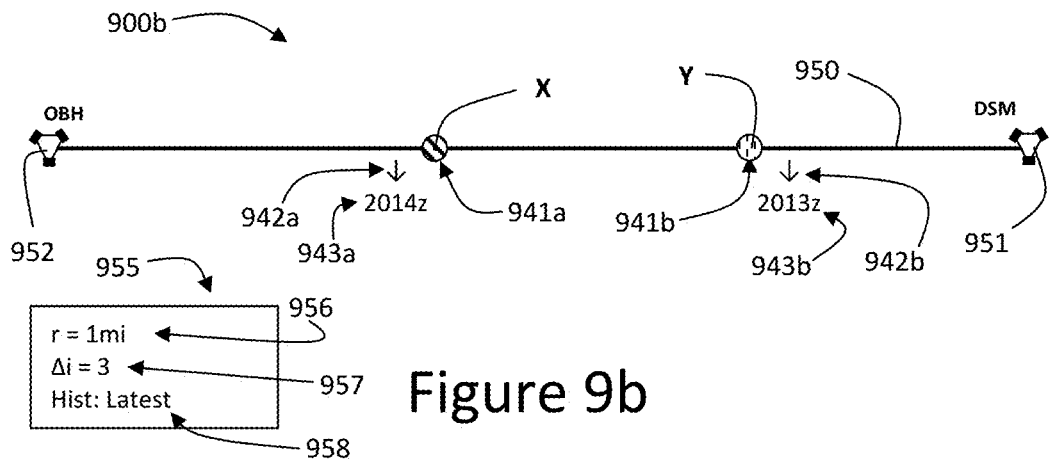
Figure 9C:
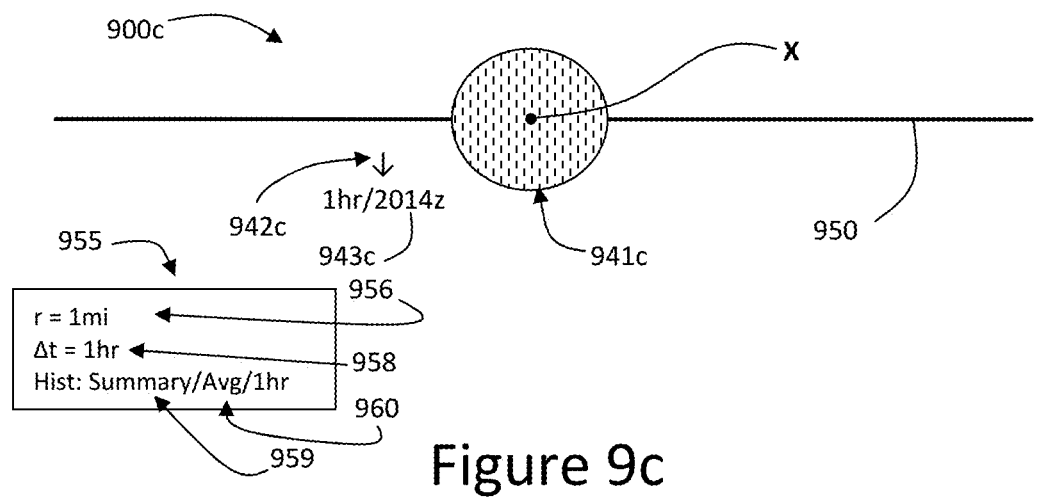

FIGS. 9a-c illustrate another method for providing an analytical method of summarizing a group of data points, specifically a historical aggregation of reported data. FIG. 9a shows a traditional spatial display mode with an airway 950 defined by two VOR/TACAN (VORTAC) station terminators 951 (DSM) and 952 (OBH). There are three reporting aircraft 910, 920, 930 traveling along the airway from right to left. Reporting aircraft 910 is followed by reporting aircraft 920 which is followed by reporting aircraft 930. As in the above discussion, let $t_0$ be the current time, $t_{-1}$ be the next most recent time, $t_{-2}$ the time interval before $t_{-1}$, and $t_{-3}$ the time interval before $t_{-2}$. Time correlated positions of the reporting aircraft are then 'a', 'b', and 'c' representing the positions of the reporting aircraft at $t_0$, $t_{-1}$, and $t_{-2}$ respectively. For purposes of demonstration, it is stipulated that the positions of the three aircraft 910c, 920b and 930a, corresponding to times $t_{-2}$, $t_{-1}$, and $t_0$ respectively, are all within one mile radius of position X represented by circle 940a. Further let it be stipulated that for purposes of mapping data, data points within a one mile radius of position X (940a) can be considered collocated at position X. Thus, 910c represents the oldest sensed value at position X and 930a represents the most current value.

Further stipulate for purposes of illustration, that the positions of the aircraft 920c and 930b corresponding times $t_{-2}$, and $t_{-1}$ respectively are within one mile radius of position Y represented by circle 940b (Note that lead aircraft 910 has already passed position Y at time $t_0$). Further, let it be stipulated that for purposes of mapping data, data points within a one mile radius of position Y (940b) can be considered collocated at position Y. Thus, 920c represents the oldest sensed value at position Y, and 930b represents the most current value at position Y. This data is listed in Table 6.

TABLE 6

| Aircraft | Time Interval | Position | Sensed Turbulence Level |
|---|---|---|---|
| 910 | $t_{-2}$ (2012Z) | X (910c) | RED |
| 920 | $t_{-1}$ (2013Z) | X (920b) | YELLOW |
| 930 | $t_0$ (2014Z) (current) | X (930a) | GREEN |
| 920 | $t_{-2}$ (2012Z) | Y (920c) | RED |
| 930 | $t_{-1}$ (2013Z) | Y (930b) | YELLOW |

FIG. 9b illustrates how the multiple reports in FIG. 9a might be summarized and displayed as a historical aggregation of data. Sometimes pilots might be interested in a summary of reported data instead of numerous individual reports. For example, looking ahead in the flight plan to an upcoming leg, pilots might be interested in seeing a summary of reports over some period of time, e.g. the last hour or so. Referring again to the data in Table 6 and illustrated in FIG. 9a, the three reports represented by 910c, 920b, and 930a at location X are shown summarized as icon 941a in FIG. 9b. Similarly the two reports represented by 920c, and 930b at location Y are shown summarized as icon 941b in FIG. 9b.

In FIG. 9b, the reporting aircraft icons 910c, 920b, and 930a have been replaced with the summary point 941a. The fill color of this point could be representative of the most recent (t=0) data sensed at this location, or it could be a statistical summary ('statistical mode') of a plurality of data over a specified time interval, e.g. average, median, etc. FIG. 9b represents the former case (latest data); the most recent report in this example is reporting aircraft 930a which had a sensed level of GREEN. In the latter case, the average might be YELLOW. In addition to the summarized turbulence intensity level (TB), additional data provided might be a trend vector indicator 942a and the Zulu time 943a of the most recent reading (2014z). The trend vector 942a might indicate how (if) prior historical data values are trend related. In the example given, the readings fell in magnitude from RED to YELLOW to GREEN (Table 6), so the trend is towards less turbulence, and a 'down' arrow 942a is indicated. If the historical data are more random, the trend vector arrow might be replaced with a dashed line (see 9c). Similarly for point Y, the fill color of this point may either be representative of the most recent (t=−1) data sensed at this location or a historical aggregate. In the former, reporting aircraft 930b had a sensed level of YELLOW. In addition to the sensed turbulence intensity level (TB), additional data provided are trend vector indicator 942b and the Zulu time 943b of the most recent reading (2013z). The trend vector 942b might indicate how prior readings and the final displayed value are related. In the example given, the readings fell in magnitude from RED to YELLOW (Table 6), so the trend is towards less turbulence, and a 'down' arrow 942b is indicated. The choice of historical data aggregation between a summary or the latest value may be made available as a pilot selection on an MCDU page as described below.

FIG. 9c is an expanded view at position X to more clearly illustrate these features but using the 'summary/avg/1 hr' historical display mode versus the 'latest' mode in 9b. The fill color of this point is representative of the average data sensed at this location during the analysis period. In this example; that is reporting aircraft 910c, 920b, and 930a which had an average sensed level of YELLOW averaged over the one hour time period ending at 2014z. (Note: the data in Table 6 indicates the three samples were received over a two minute time period; for the purposes of this example, we will stipulate that this is one hour's worth of sensed data). Shown are the trend vector indicator 942c and the Zulu end time (2014z) 943c of the aggregating time period ($t_{agg}$=1 hr). The trend vector 942c indicates the fall in magnitude from RED to YELLOW to GREEN during the sampling window (Table 6). If the data sampled during the statistical window were randomly dispersed in intensity, i.e. no trend, the trend vector would be represented as a dashed line or the like.

As mentioned above in connection with earlier display figures, there are numerous variables 955 affecting the display. For example, the radius (r) 956 of the reported data proximate to the location (X or Y) selected for graphing and the temporal window ($\Delta i$) (i.e. number of reporting intervals) 957 within which the data is selected for analysis may be displayed. Also, when the historical summary method is chosen, aggregation mode 959, statistical mode 960, and the time window ($\Delta t$) over which the historical data is aggregated 958 may be displayed. In some exemplary embodiments, these selections may be made through a combination of MCDU page selections [1110, 1140 FIG. 11] or from actions on the display itself such as 'right clicking' and selecting from a control window such as a 'drop down' menu or the like. In some exemplary embodiments, a display window such as 955 may be displayed within the display frame to remind the pilot of display selections active.

As mentioned above, an objective of the present invention is to utilize the existing ADS-B messaging protocol so that additional weather information such as turbulence, winds aloft, temperature and the like can be conveyed directly between airborne aircraft and between aircraft in flight and a ground station using the existing ADS-B system. The ADS-B message structure protocol for 1090ES ADS-B (Out) messages is shown in FIG. 10. The 112 bit extended squitter message 1010 is shown containing 8 control bits, 24 bit ICAO address, 56 bits of ADS-B data, and 24 bit parity. The 56 bits of ADS-B data 1020 includes format type code (TC), 5 bits (FIG. 10, 1060) and 51 bits of data (FIG. 10, 1070). The message 'format type code,' 'type code,' or just 'type,' is used so that the receiving processor knows which decoding algorithm to use to decode the data.

Currently there are several 'type codes' (25-27, 29, 30) which are designated as 'reserved.' Additionally, there are other message types which are defined but have unused data bits. In one exemplary embodiment of the present invention, one of the 'reserved' message types is re-designated to include sensed weather such as turbulence, winds aloft, temperature and the like. In another exemplary embodiment, one of the currently defined message types having additional data bandwidth is redefined to include sensed weather parameters in the spare/unused data bit field.

The great benefit of using the existing ADS-B system in general and currently reserved message types in particular, to convey sensed airborne weather, is that it has minimal impact on existing aircraft and on the overall National Airspace System (NAS). For example, except for the possible necessity of a dedicated turbulence sensor, all of the hardware components of the system are already installed on the aircraft. Regarding software, since the exemplary implementations described herein utilize reserved message types or spare bandwidth in existing messages, existing broadcast and decoding functions would not be affected since reserved messages or unused fields are currently being ignored. Thus, modifications could be rolled out on a non-interference basis with current aircraft operations. Furthermore, by minimizing the amount of new hardware and software needed to perform the turbulence detection/display function, the cost of the introduction into the aircraft fleet is minimized.

Note that while the above description focused on the details of the 1090ES ADS-B (Out) message structure, it is generally applicable to the 978 UAT message structure with some minor modifications. For example, in the 978 UAT message structure, several Type Codes are designated as reserved. Also, the payload structure, while not identical to the 1090ES structure, may be utilized to transport the turbulence data using one of the reserved Type Codes.

Figure 10A:
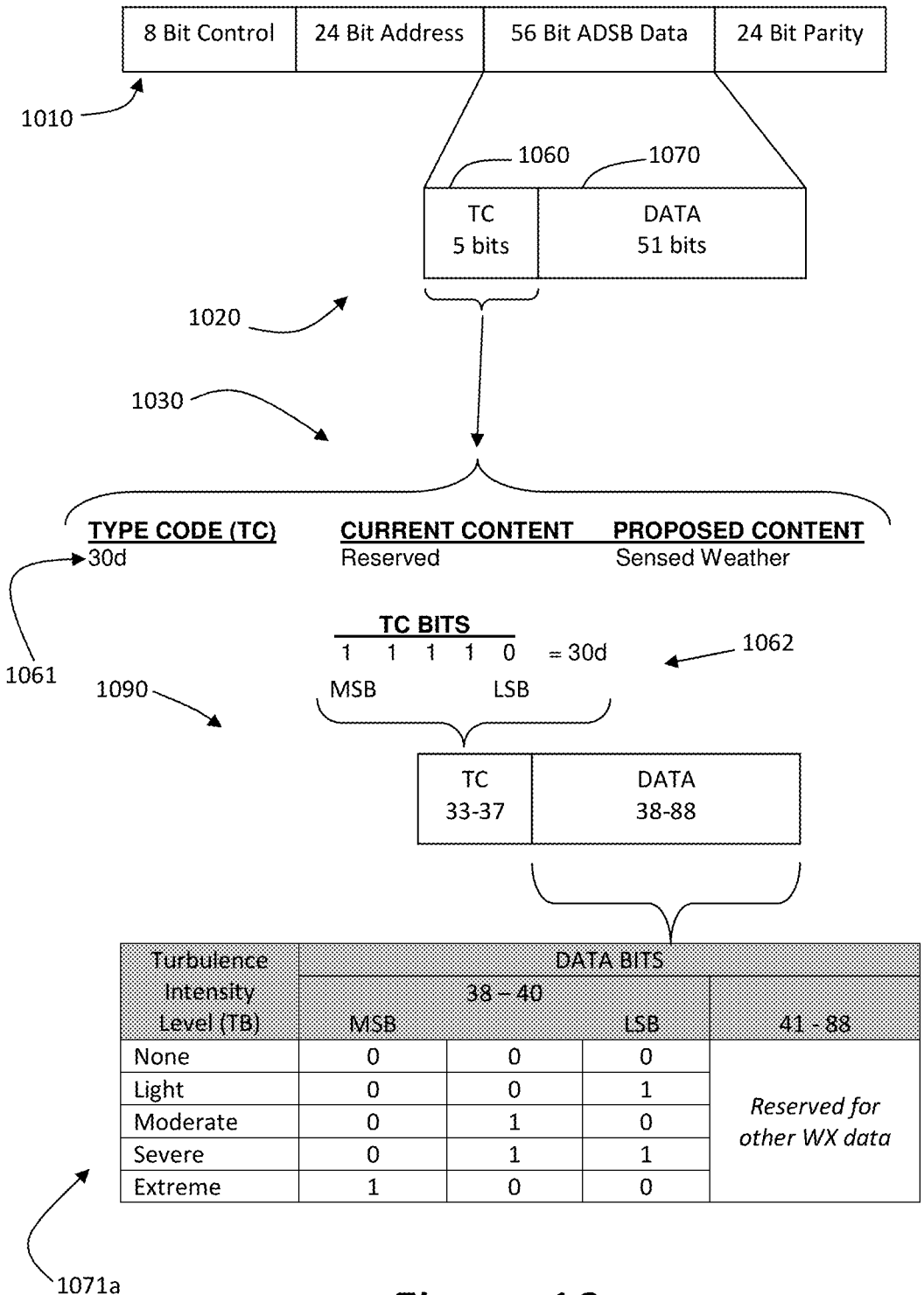
FIGS. 10a,b illustrates the existing 1090ES ADS-B message structure including 'Type Codes' and how existing reserved message format could be repurposed to encode the turbulence data into a 1090ES ADS-B message.

FIGS. 10a, b illustrate two examples of how a data message utilizing one of the currently reserved type codes might be structured. In another exemplary embodiment, an existing message may be repurposed or modified to include the turbulence data as described below. It should be noted and will be well understood by those in the art, that specifics of the data structure and the specific reserved type code utilized may be modified without deviating from the overall intended scope of the invention.

The ADS-B data message structure 1010, including data bit allocations, includes 56 bits of ADS-B data. The 56 bits of ADS-B data are subdivided into format type code (TC), bits 33-37 (FIG. 10a, 1060); and data, bits 38-88 (FIG. 10a, 1070). As mentioned, in one exemplary embodiment, a currently reserved message type is re-designated as a 'sensed weather' message definition. The sensed weather could then be broadcast in the same manner as other ADS-B messages. In a second embodiment, spare data bandwidth in an existing message is used to convey the sensed weather data. As one example of the former, message type 30d is currently designated as reserved. Message type 30 1061 might be re-designated as a sensed weather message. Data bits 38-88 of the data field could then be encoded with the sensed weather data. In one exemplary embodiment of the present invention, sensed weather includes sensed turbulence intensity level (TB) 1071a FIG. 10a. In another embodiment, turbulence duration (TD) is also included (FIG. 10b)

An example of the newly defined message is shown in FIG. 10a. The format type code and data fields are shown at 1090 with type code 30d defined as sensed weather (1061) and the sensed turbulence intensity level (TB) as enumerated in the data table 1071a (see also Table 1 for definitions). As discussed above, 3 data bits are needed to represent the 5 levels of turbulence specified in the AIM. As an example, bits 38-40 (1071a) in the DATA block could be used for this. That leaves bits 41-88 available for reporting other sensed weather data such as wind speed/direction, temperature, pressure etc. These other weather data are all available from typically installed FMS LRUs such as Air Data Computers, Inertial Reference Units, and Global Positioning Systems. While the turbulence data might be most relevant to other airborne aircraft, other sensed weather data aloft might be used by personnel at the National Weather Service (NWS) to aid in their weather reporting and prediction functions. While FIG. 10a illustrates how the turbulence intensity level (TB) might be encoded, recall that there is an additional descriptive parameter referred to as turbulence duration (TD) (Table 2). This parameter may be encoded as well as illustrated in FIG. 10b.

Figure 10B:
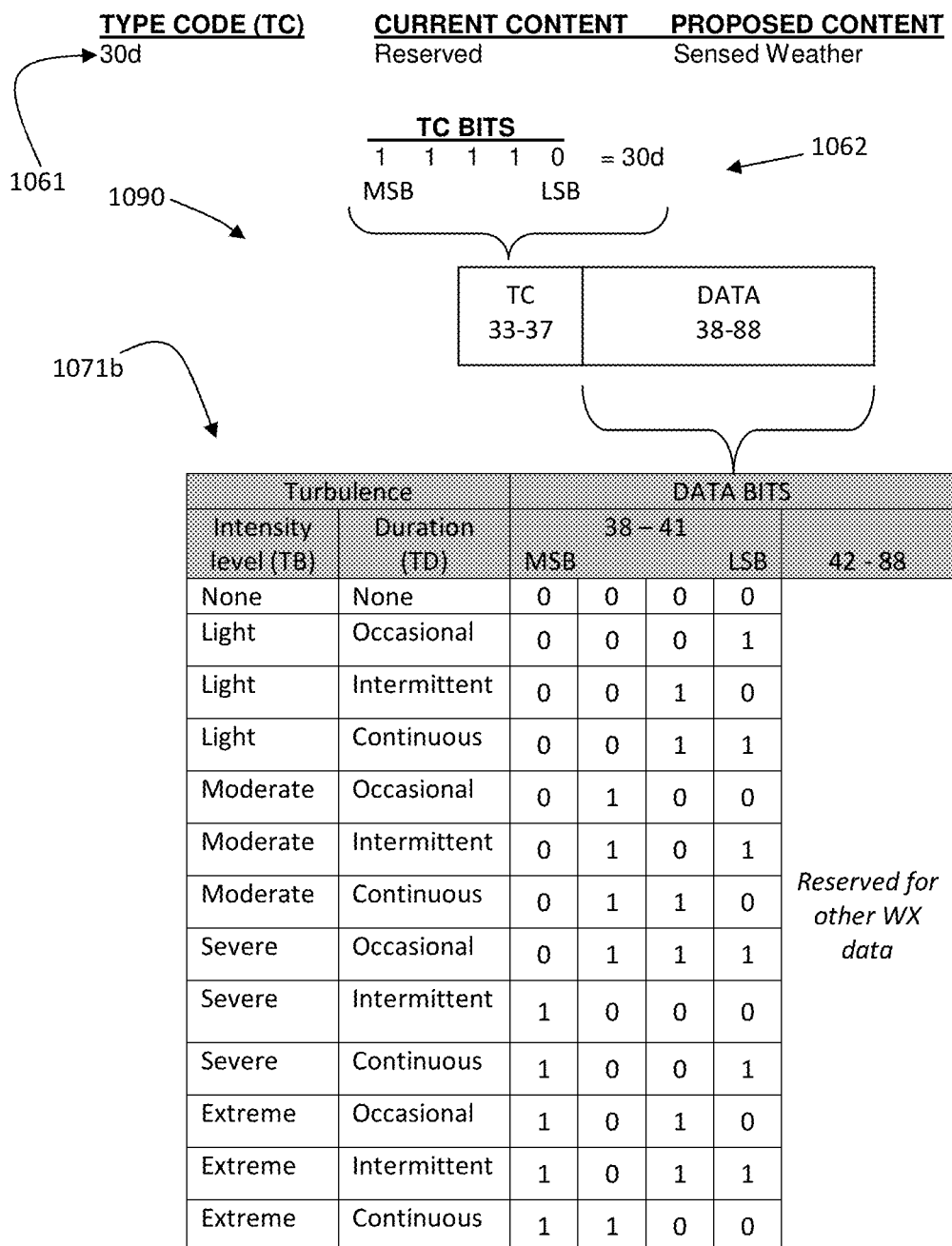

The message definition 1071b FIG. 10b allows for both the turbulence intensity level (TB) as well as the turbulence duration (TD) to be encoded. The format type code and data fields are shown at 1090 with type code 30d defined as sensed weather (1061) as was above in FIG. 10a. However, in the embodiment of FIG. 10b, the turbulence duration (TD) has been added. Recall from earlier discussion that there are three classes of turbulence duration (TD): occasional, intermittent, and continuous. By adding one additional bit of data, these classes, in addition to the 5 intensity states, may be described (see Table 2) in 4 bits as enumerated in the data table (1071b). As an example, bits 38-41 (1071b) in the DATA block could be used for this. That leaves bits 42-88 available for reporting other sensed weather data such as wind speed/direction, temperature, pressure etc.

While an example of reserved message and data definition has been given, it is clear that other messages/format type codes may be substituted without departing from the teachings of the invention.

While a real-time aircraft turbulence sensing and mapping method for enhancing passenger safety and comfort system and method has been described with reference to various exemplary embodiments and component choices, it will be understood by those skilled in the art that various changes may be made as noted throughout the specification including substitution of various sensor components, methods for executing processor instructions and the like, including changes in function and arrangement of components or process steps without departing from the scope of the teachings herein. In addition, many modifications may be made to adapt the teachings herein to a particular architecture without departing from the scope thereof.

What is claimed is:

1. A turbulence reporting system for automated real-time reporting and display of sensed aircraft turbulence data to other aircraft and ground stations using the Automatic Dependant Surveillance-Broadcast (ADS-B) system, the ADS-B system employing standard messaging protocol including pre-defined format type codes defining the format and substance of data contained within each message, the ADS-B system messages comprising a plurality of defined (assigned) message format type codes as well as a plurality of 'reserved' message format type codes, the ADS-B system having a processor system configured to receive aircraft data, including turbulence data and encode the data into messages according to ADS-B format type code definitions, and a transmitter system for broadcasting (transmitting) the so constituted ADS-B messages, the automated turbulence reporting system comprising:
    a turbulence sensor system for sensing and communicating sensed turbulence data, the turbulence sensor system including,
        a turbulence sensor for sensing turbulence and producing a raw turbulence data output, and
    a processor system in communication with the turbulence sensor and the ADS-B system and configured to:
        receive the raw turbulence data from the turbulence sensor;
        process the received raw turbulence data to determine a turbulence intensity level; and
        communicate the turbulence intensity level to the ADS-B system, the ADS-B system processor receiving the turbulence data from the turbulence system processor and encoding (incorporating) the turbulence intensity level into an ADS-B standard protocol message, defining a turbulence message comprising the turbulence intensity level, and communicating the turbulence message to the ADS-B transmitter system for periodic broadcast (transmission).

2. The automated turbulence reporting system of claim 1 wherein the turbulence message utilizes an ADS-B standard protocol message having a previously designated 'reserved' format type code re-designated to be the turbulence format type code, defining the format of the turbulence data contained therein.

3. The automated turbulence reporting system of claim 1 wherein the turbulence message is constructed from an ADS-B standard protocol message with a non-reserved (assigned) format type code having spare data bits.

4. The automated turbulence reporting system of claim 2 wherein the turbulence message is constituted from one or more ADS-B messages with currently 'reserved' format type codes selected from codes 25, 26, 27, 29, or 30.

5. The automated turbulence reporting system of claim 1 wherein the step of processing the raw turbulence data includes analyzing the raw measurement data and assigning the measurement to an FAA defined turbulence level.

6. The automated turbulence reporting system of claim 1 wherein the aircraft further includes a Flight Management System (FMS) having at least a processing system, and wherein the turbulence processor is part of the FMS processing system, the step of processing and communicating the processed turbulence data to the ADS-B system being accomplished with the FMS processing system.

7. The automated turbulence reporting system of claim 1 further including executable software code programmed into the turbulence processor system, the software code when executed causes the turbulence processor to:
    periodically sample the turbulence system sensor to acquire raw turbulence data samples,
    process the raw turbulence data samples to determine turbulence intensity level therefrom, and
    communicate the turbulence intensity level to the ADS-B system for incorporation into an ADS-B message for transmission.

8. The automated turbulence reporting system of claim 7, the turbulence reporting system further including executable software code programmed into the ADS-B processor, the software code when executed causes the ADS-B processor to:
    receive the turbulence intensity level from the turbulence processor,
    encode the received turbulence intensity level into one of the previously 'reserved' designated ADS-B standard protocol message formats, the newly designated format type code defining a turbulence format type code and a message so constituted defining a turbulence message, and communicate the turbulence message to the ADS-B transmitter to transmit the turbulence message.

9. The automated turbulence reporting system of claim 8, the aircraft further having a display system for displaying aircraft data to the aircrew and wherein the ADS-B system further includes a receiver system configured to receive ADS-B messages (ADS-B (In)), including turbulence messages, from other aircraft or ground stations, the ADS-B processor software code when executed:
  decodes the received turbulence messages in accordance with the designated turbulence format type code,
  processes the decoded turbulence message into turbulence display messages, and
  communicates the turbulence display message to a pilot display for display of the turbulence data.

10. A process for automatically distributing turbulence reports between a reporting aircraft and a receiving aircraft, the aircraft each having an ADS-B system currently utilized for reporting aircraft position to each other via ADS-B messages having pre-defined format type codes, the format type code defining the substance and format of the data contained therein, the ADS-B system messages comprising a plurality of defined message formats as well as a plurality of 'reserved' message formats, the reporting aircraft further having a turbulence sensing and reporting system for sensing and reporting turbulence, the automated turbulence sensing and reporting system piggybacking on the existing ADS-B system by using its processing, transmitting, and receiving subsystems for distributing and presenting the turbulence reports, by repurposing one or more of the currently reserved ADS-B system messages for conveying the turbulence data between aircraft, the process including:
  acquiring raw sensed turbulence data using the turbulence sensing and reporting system,
  processing the raw turbulence data with the turbulence sensing and reporting system to determine a turbulence intensity level,
  communicating the turbulence intensity level to the ADS-B system, the ADS-B system encoding (incorporating) the turbulence intensity level into one or more previously designated 'reserved' ADS-B standard protocol message formats, the newly designated format type code defining a turbulence format type code, the constituted message defining a turbulence message, and
  broadcasting the turbulence message via the ADS-B system transmitter.

11. The process for automatically distributing turbulence reports between aircraft of claim 10 wherein the newly designated turbulence format type code is approved by the Federal Aviation Administration (FAA).

12. The process for automatically distributing turbulence reports between reporting and receiving aircraft of claim 10 wherein the reporting aircraft ADS-B system includes at least ADS-B (out) functionality and wherein the receiving aircraft ADS-B system includes at least ADS-B (in) functionality and wherein the receiving aircraft further includes a display system in communication with the ADS-B (In) system, the process further including:
  receiving turbulence messages from a reporting aircraft using the ADS-B (In) system,
  decoding the received turbulence messages in accordance with the designated turbulence format type code,
  processing the decoded turbulence data into a turbulence display message, and
  communicating the turbulence display message to the aircraft display system for display of the received turbulence reports to the aircraft crew.

13. The process for automatically distributing turbulence reports between aircraft, the aircraft of claim 12 wherein the receiving aircraft further includes a display control system for allowing the crew to select various display formats for display on the aircraft display system, the process further including:
  selecting a display format using the display control,
  selecting a display range using the display control, and
  displaying the turbulence data in accordance with the selected display format and display range.

14. The process for automatically distributing turbulence reports between aircraft, the aircraft of claim 13 wherein the selectable display formats include a flight plan overlay format wherein the turbulence report data is displayed as an overlay on the flight plan map.

15. A processor system comprising computer software code executable on the processor system, the computer software code facilitating the detection and reporting of turbulence on and between a reporting aircraft and one or more receiving aircraft equipped with a turbulence detection system and an Automatic Dependent Surveillance-Broadcast (ADS-B) surveillance system, the turbulence detection system comprising at least a sensor and a processor, the ADS-B system comprising at least a transmitter system for transmitting ADS-B messages and a processor for receiving aircraft data inputs, including turbulence data, and encoding the aircraft data into ADS-B standard protocol messages for the transmitter to broadcast to other aircraft or ground stations, the broadcast ADS-B messages having industry standard definitions specified by a format type code associated with each message, the format type code defining the substance and format of the data contained therein, the ADS-B system comprising a plurality of defined message format type codes as well as a plurality of type codes 'reserved' for future growth the computer software code comprising:
  first and second computer software codes programmed into, and executable on, the turbulence and ADS-B system processors respectively, the software operative to cause the turbulence and ADS-B systems to perform the sensing, processing, encoding and transmitting of turbulence messages from the reporting aircraft to one or more receiving aircraft, the first computer software code when executed in the turbulence processor:
  causing the turbulence processor to periodically sample the turbulence sensor to obtain raw sensed turbulence data,
  process the sampled raw turbulence sensor data to determine a turbulence intensity level, and
  communicate the processed turbulence intensity level to the ADS-B processor, the second computer software code when executed in the ADS-B system processor operative to,
  receive the turbulence intensity level data from the turbulence processor,
  encode the sensed turbulence data into an ADS-B message, the message being structured in accordance with ADS-B standard messaging protocols, the message utilizing a numerical format type code defining the format and substance of the message contents, the message so constituted defining a turbulence message, and
  communicate the turbulence message to the transmitter for broadcast to receiving aircraft or ground stations.

16. The processor system comprising computer software code facilitating the detection and reporting of turbulence on and between aircraft of claim 15 wherein the ADS-B software executed step of encoding the turbulence level into a message, utilizes a previously unallocated (reserved) format type code redefined and re designated as a turbulence format type code, or an allocated format type coded message having spare data bits.

17. The processor system comprising computer software code facilitating the detection and reporting of turbulence on and between aircraft claim 15 wherein communication of the processed turbulence data to the ADS-B processor occurs directly between the turbulence system and the ADS-B system.

18. The processor system comprising computer software code facilitating the detection and reporting of turbulence on and between aircraft of claim 15 the reporting aircraft further includes a Flight Management System (FMS) and wherein the turbulence processor is a component of the FMS, and wherein communication of the processed turbulence data to the ADS-B processor is accomplished with the FMS processor.

19. The processor system comprising computer software code facilitating the detection and reporting of turbulence on and between aircraft of claim 16 wherein the receiving ADS-B system is an ADS-B (In) system which further includes a receiver for receiving ADS-B messages transmitted from the ground or other aircraft and wherein the receiving aircraft further includes a display and a display control systems for selectably displaying data formats to the aircrew, the ADS-B computer software code further operative to:
  receive the received turbulence message from the ADS-B receiver,
  decode the received turbulence message according to the turbulence format type code,
  format the decoded turbulence data into a display message,
  select a display format, and
  forward the turbulence display message to the aircraft display system for display of the turbulence data, in accordance with the selected data format, to the aircrew.

20. The processor system comprising computer software code facilitating the detection and reporting of turbulence on and between aircraft of claim 19 wherein the selectable display formats includes a turbulence overlay of the flight plan stick map.

\* \* \* \* \*